United States Patent
Higashino

(10) Patent No.: US 7,548,396 B2
(45) Date of Patent: Jun. 16, 2009

(54) STORAGE APPARATUS, CONTROL METHOD, AND CONTROL DEVICE OF STORAGE APPARATUS

(75) Inventor: Yoshinari Higashino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/055,551

(22) Filed: Mar. 26, 2008

(65) Prior Publication Data
US 2009/0034117 A1 Feb. 5, 2009

(30) Foreign Application Priority Data
Jul. 30, 2007 (JP) ............................. 2007-197282

(51) Int. Cl.
*G11B 5/596* (2006.01)
(52) U.S. Cl. ............... 360/78.05; 360/78.04; 360/78.06
(58) Field of Classification Search ........................ None
See application file for complete search history.

(56) References Cited

U.S. PATENT DOCUMENTS 6,898,046 B2 5/2005 Sri-Jayantha et al.

2003/0030937 A1* 2/2003 Kohso et al. ............. 360/78.05
2003/0112547 A1* 6/2003 Koso et al. ............... 360/78.05

FOREIGN PATENT DOCUMENTS

| JP | A 63-213176 | 9/1988 |
|---|---|---|
| JP | B2 3787491 | 5/2002 |
| JP | A 2003-346441 | 12/2003 |
| JP | A 2006-179185 | 7/2006 |

* cited by examiner

Primary Examiner—Andrew L Sniezek
(74) Attorney, Agent, or Firm—Greer, Burns & Crain, Ltd.

(57) ABSTRACT

A seek control unit moves a head to the vicinity of a target track of a storage medium by coarse control, then switches it to fine control, and positions the head to the target track. A rotation disturbance compensation control unit applies a rotation disturbance vibration detection signal based on acceleration velocity sensors to the seek control unit as a compensation signal so as to cancel out rotation disturbance vibration components. A compensation control switching unit sets the rotation disturbance compensation control unit to be either on or off and, when a coarse seek error in which it is out of a fine switch error range upon coarse control by the seek control unit is finished is determined, switches the rotation disturbance compensation control unit to an opposite setting state and causes the seek control unit to perform seek again.

17 Claims, 22 Drawing Sheets

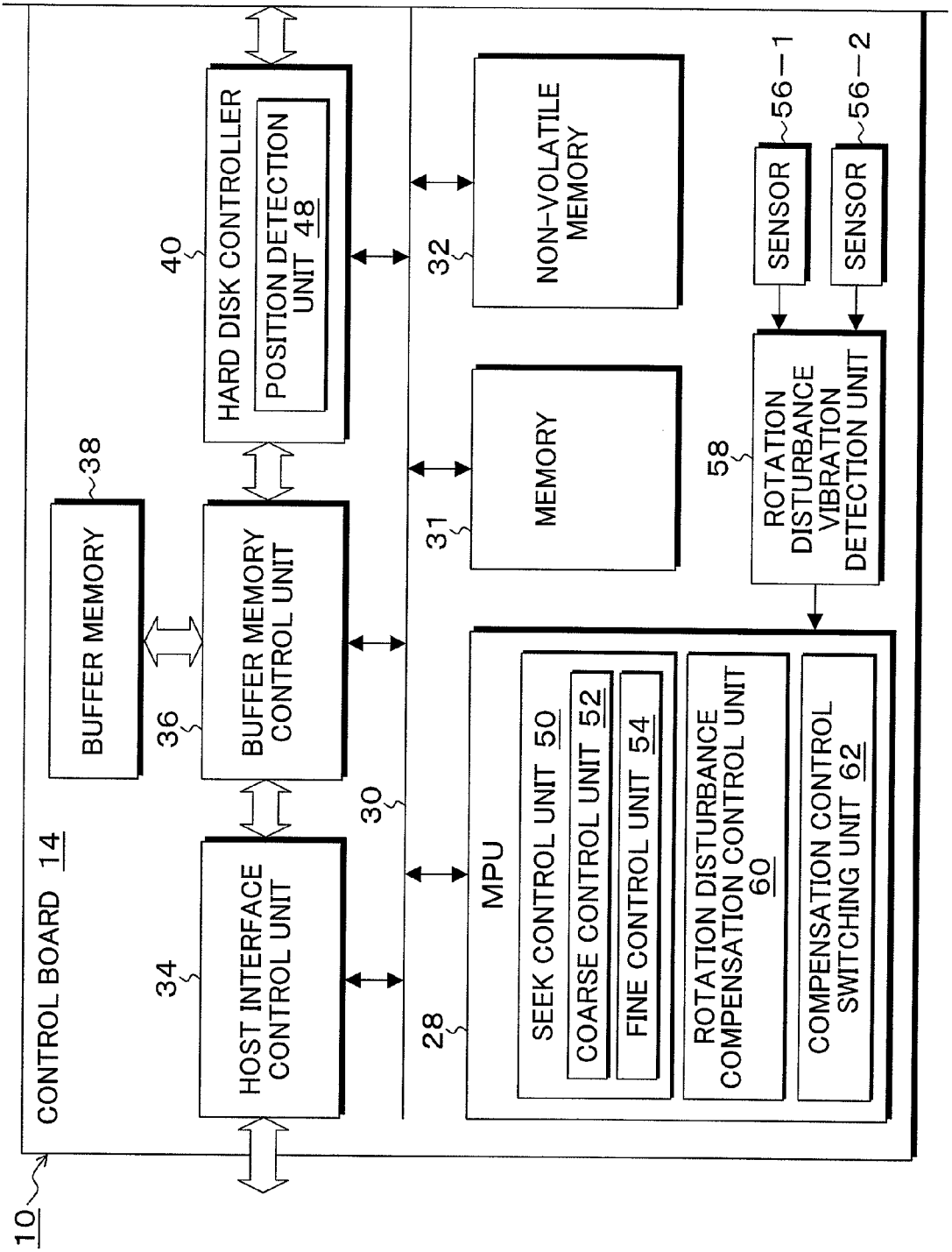

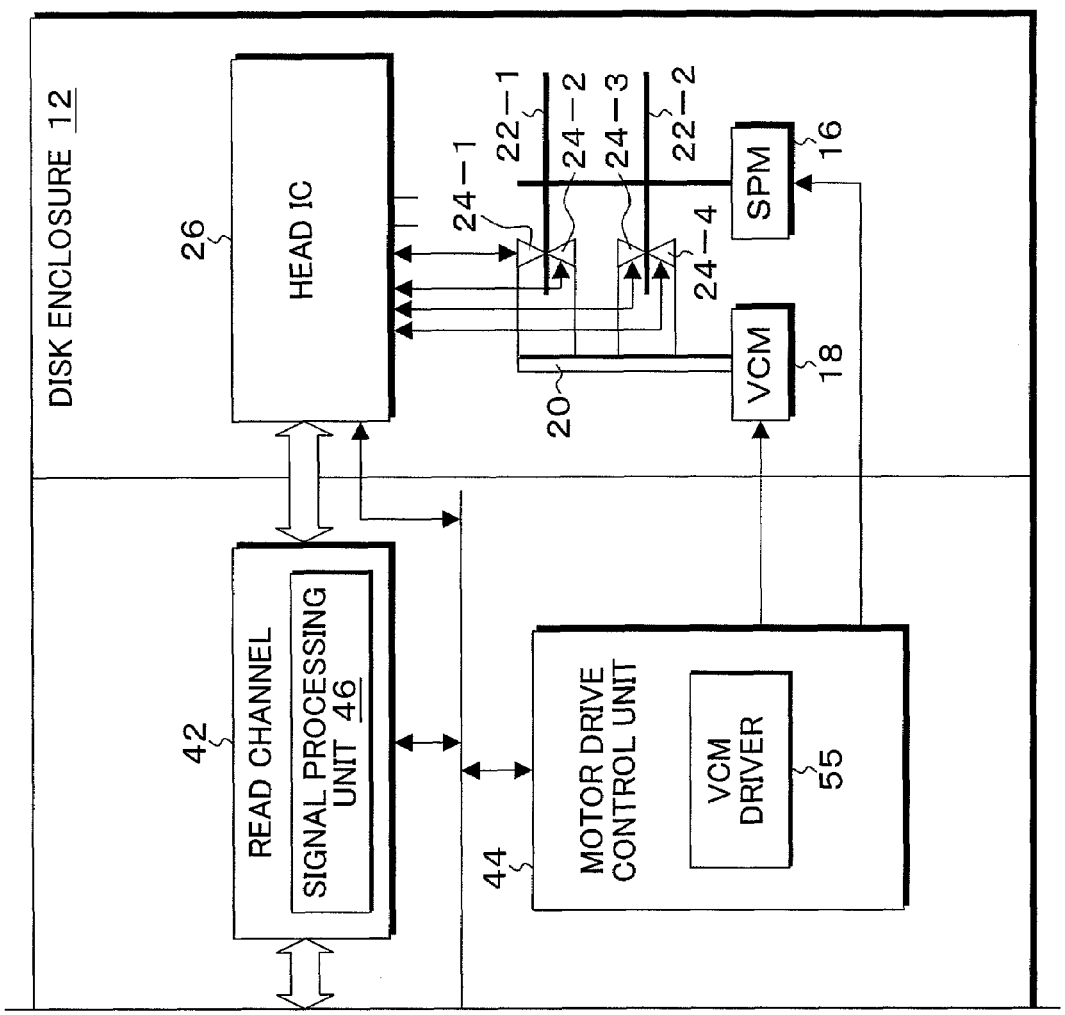

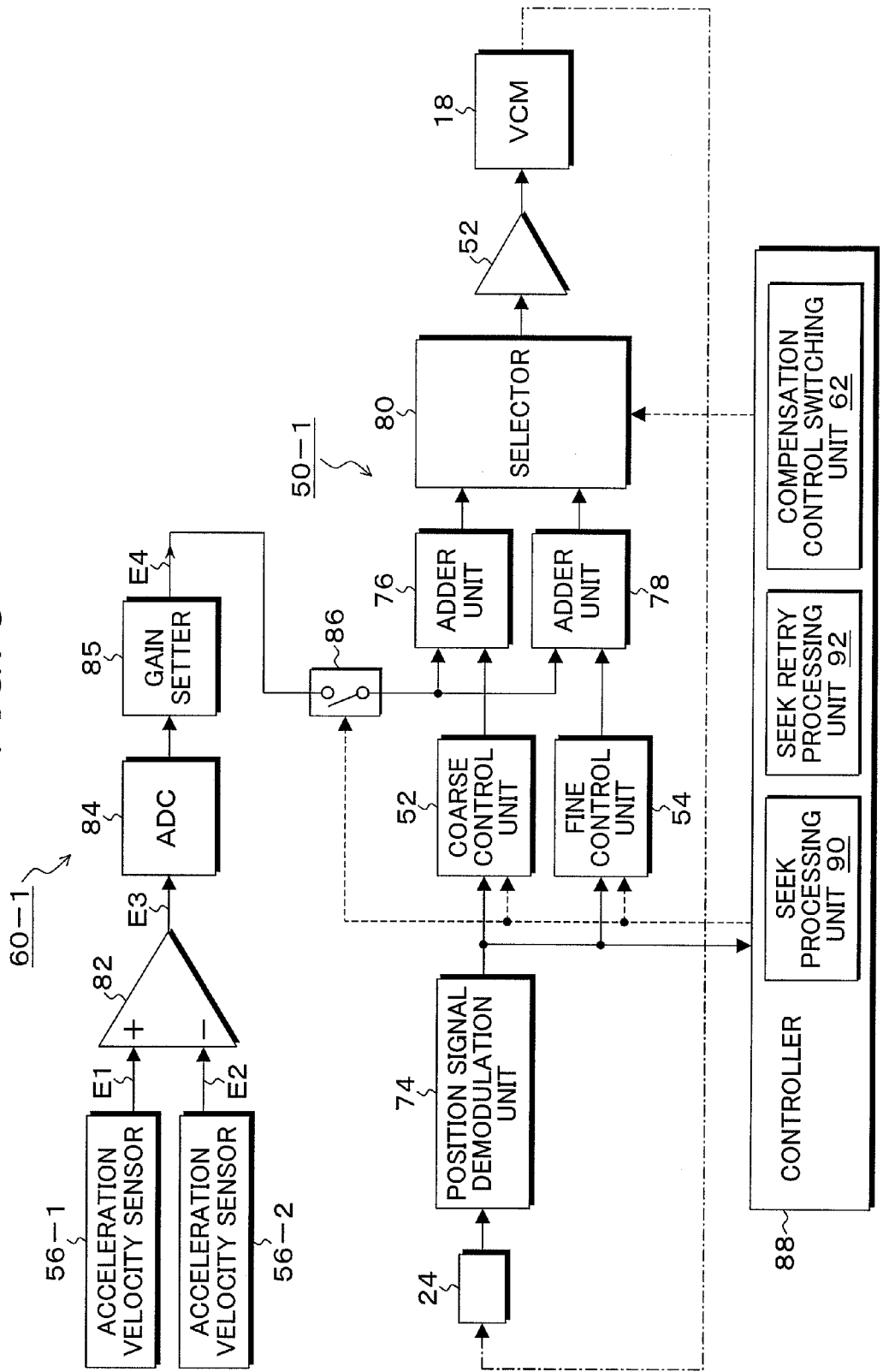

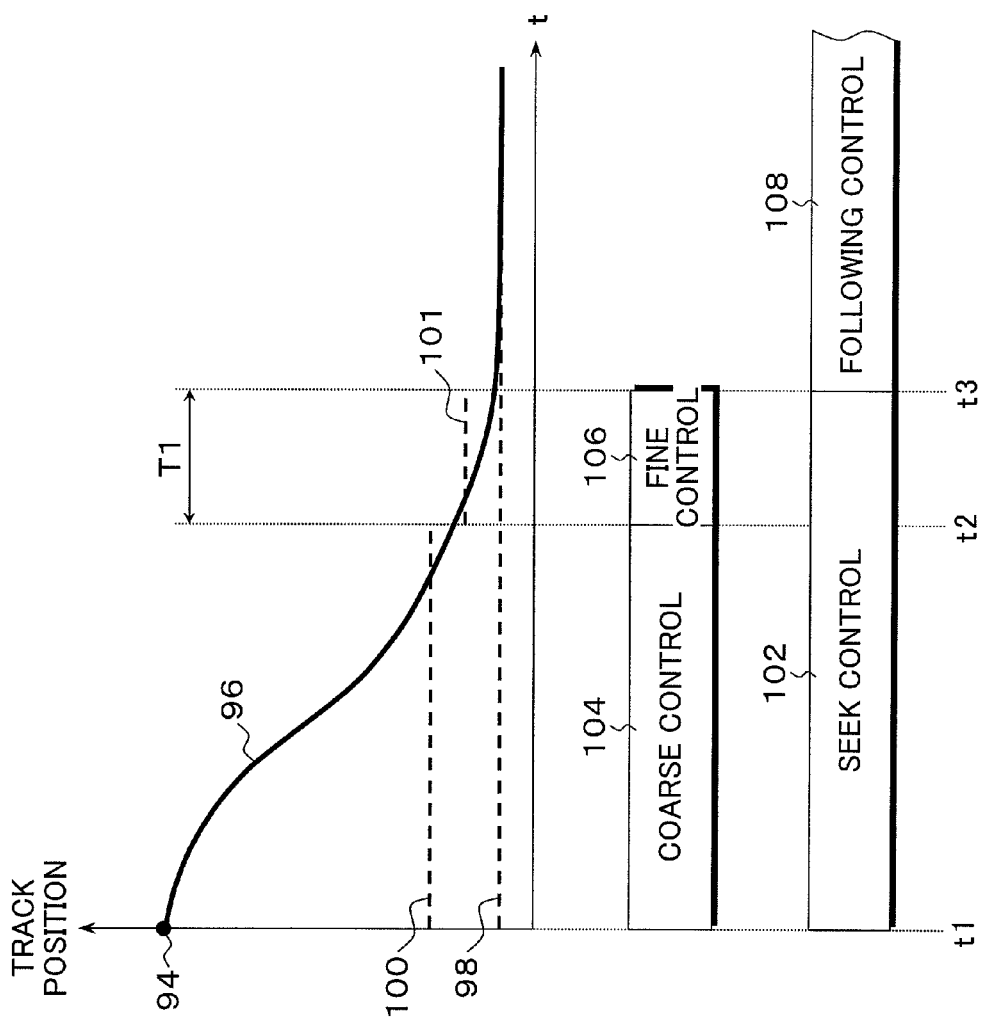

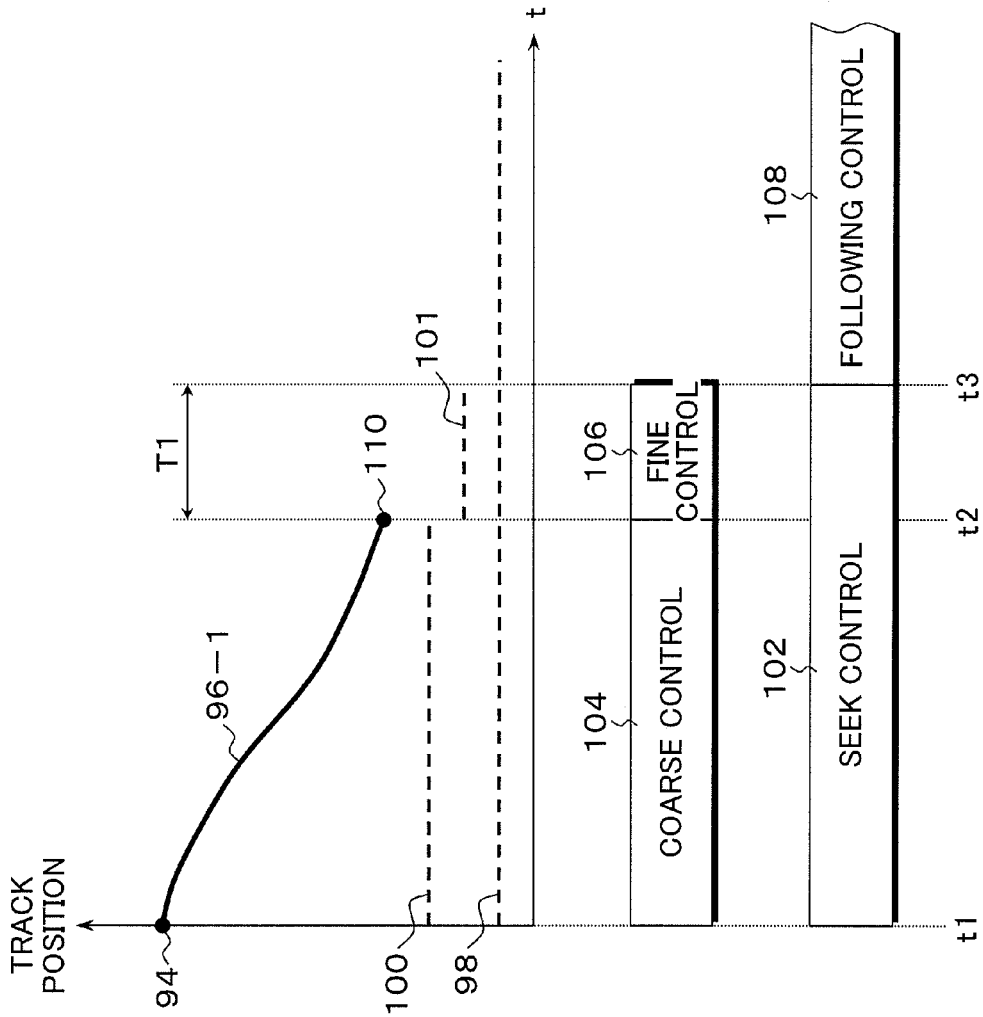

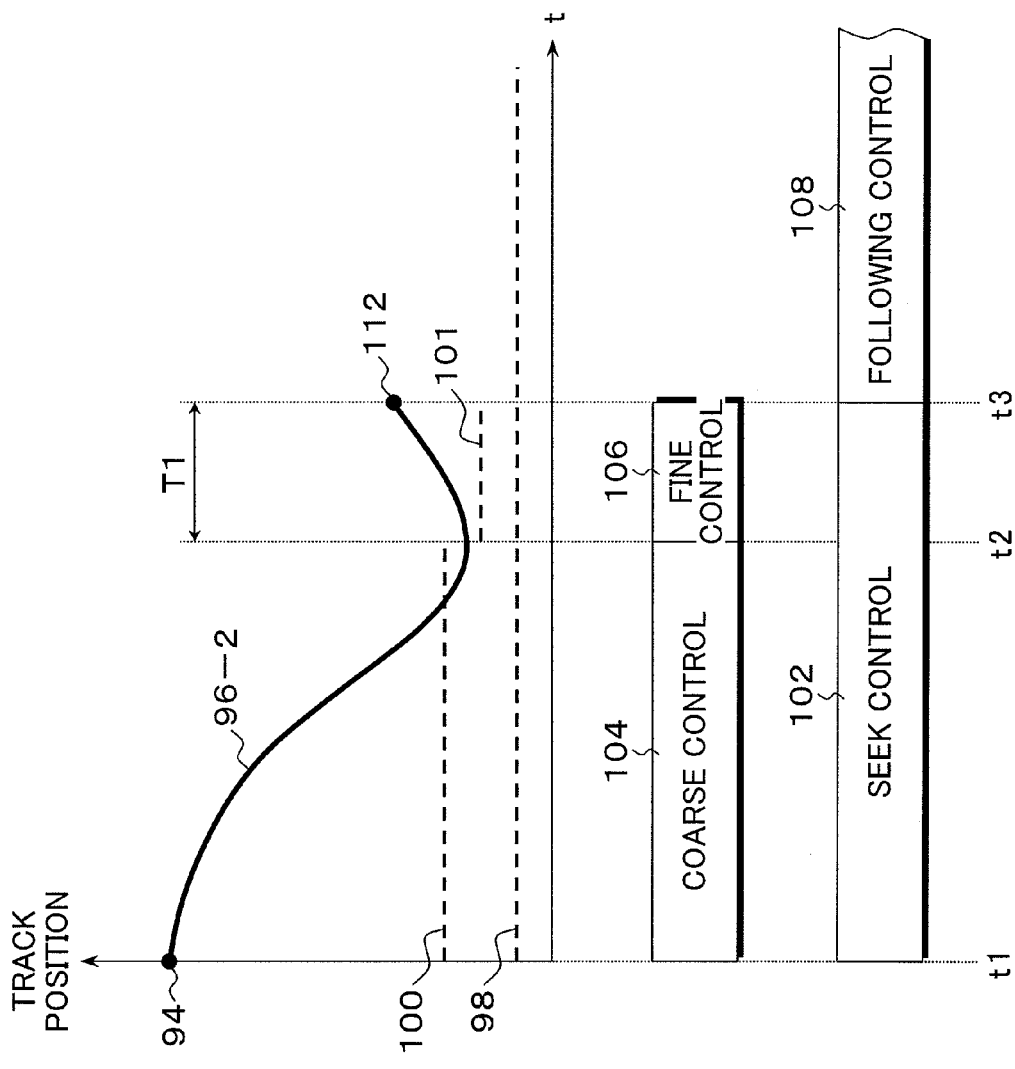

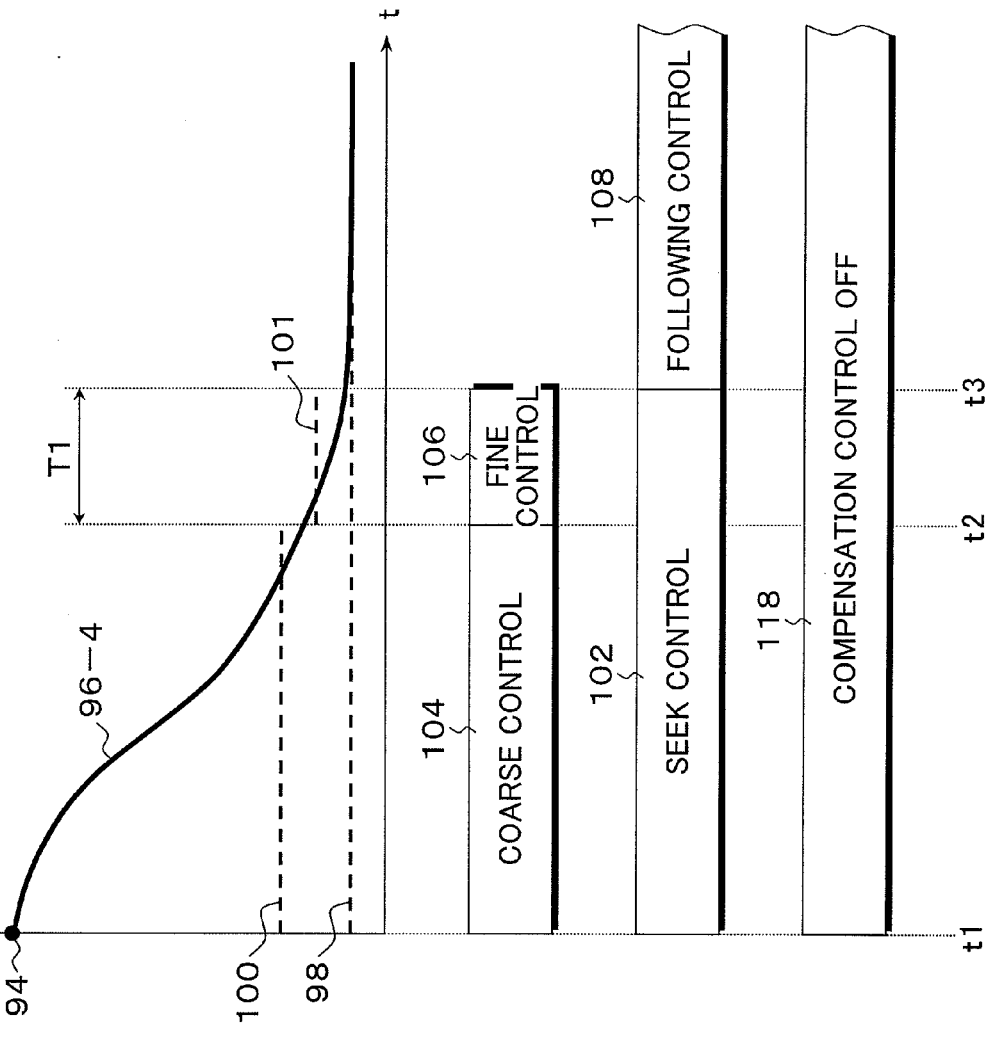

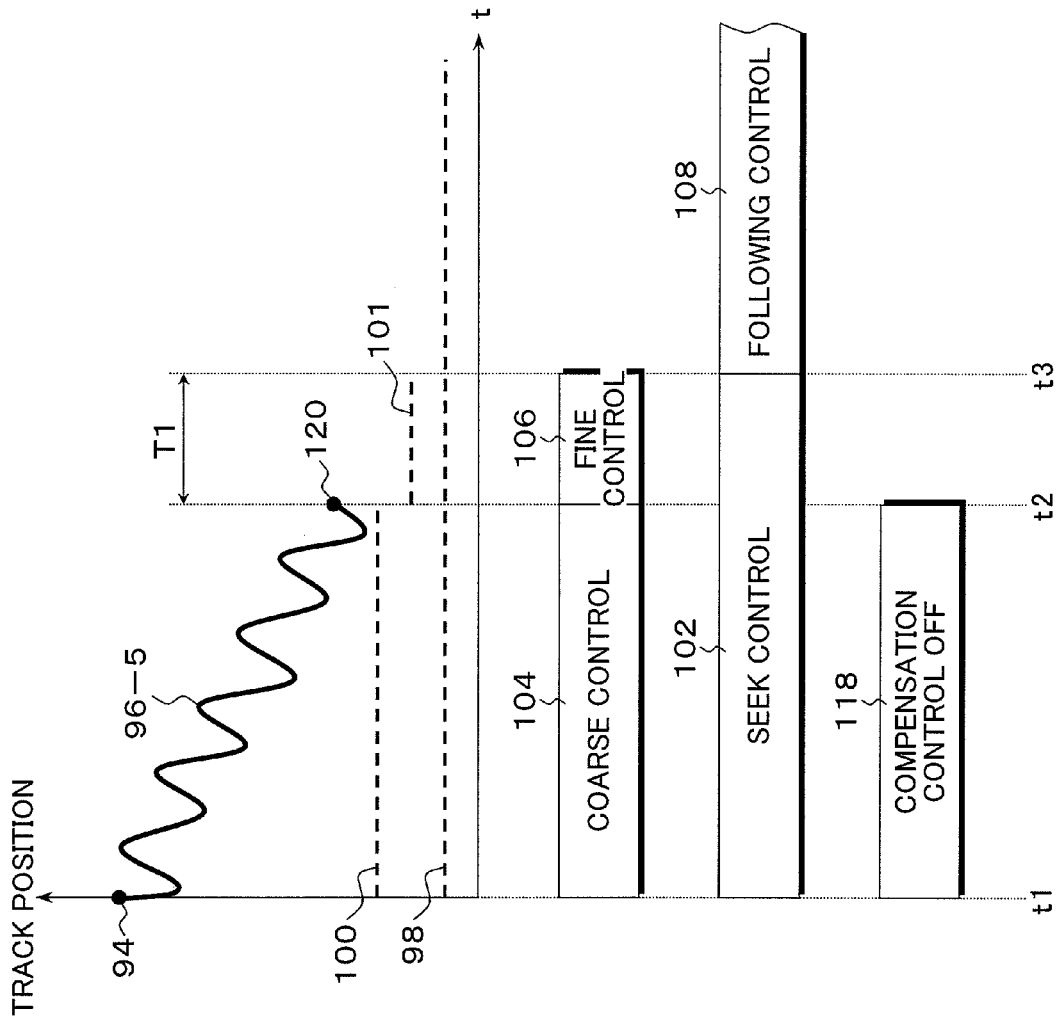

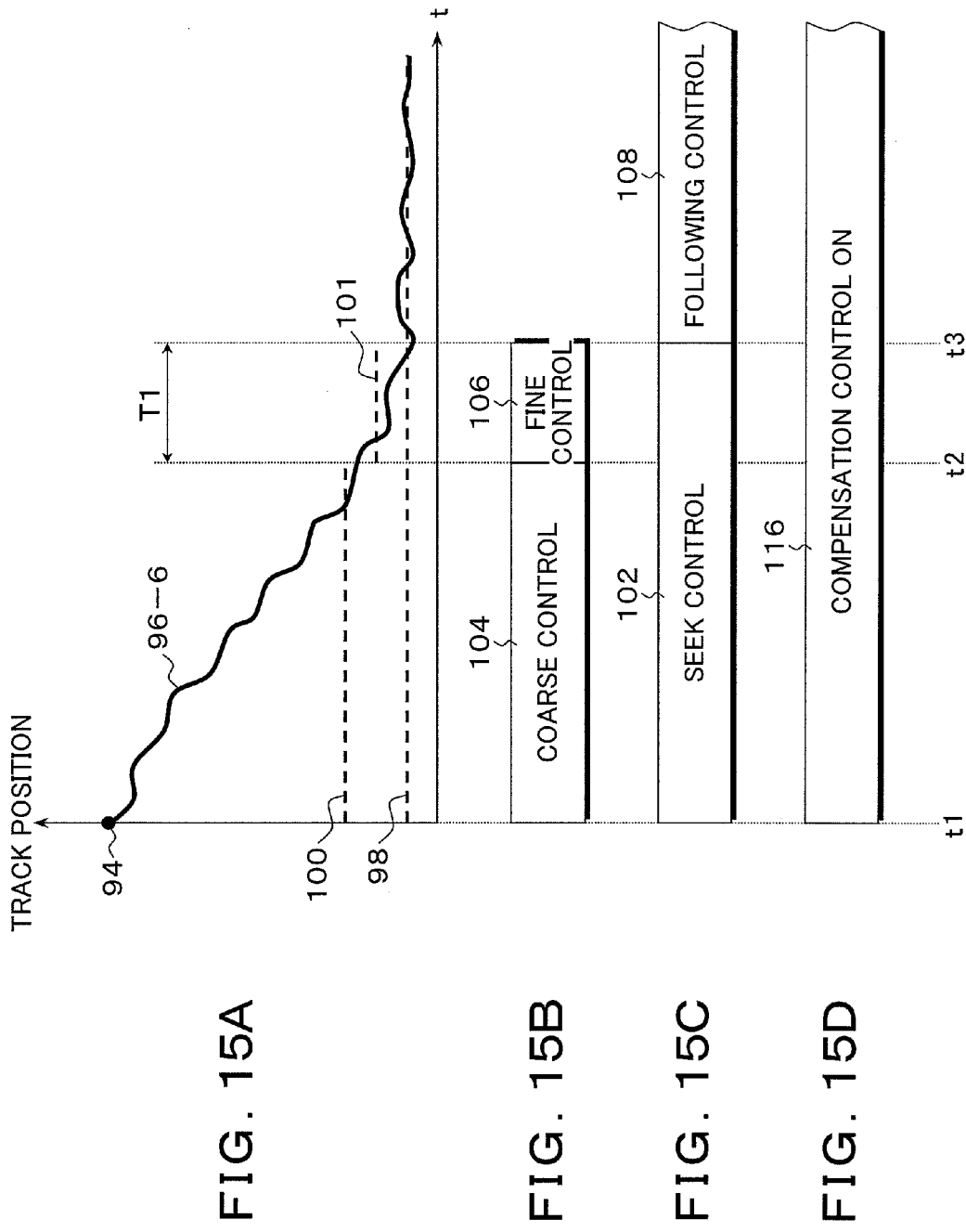

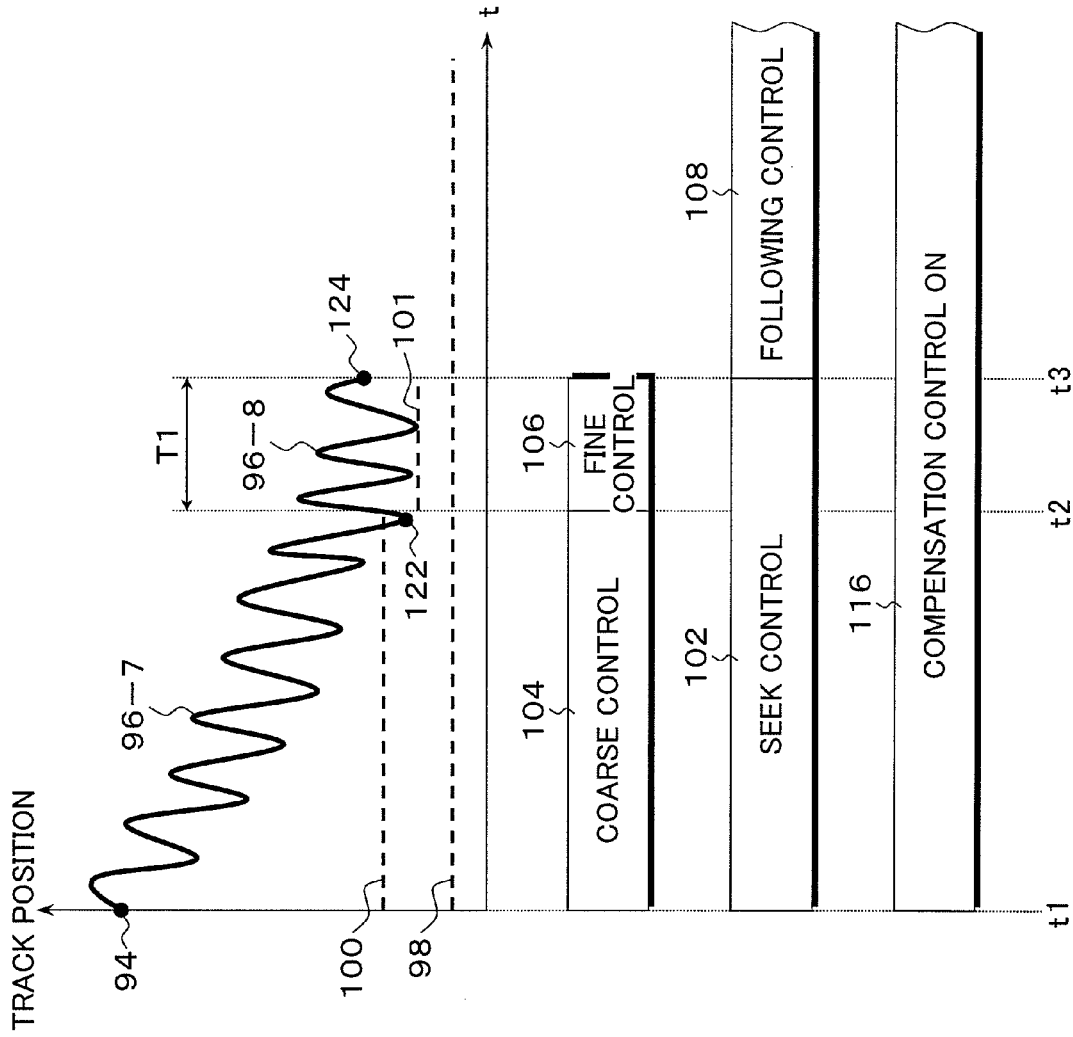

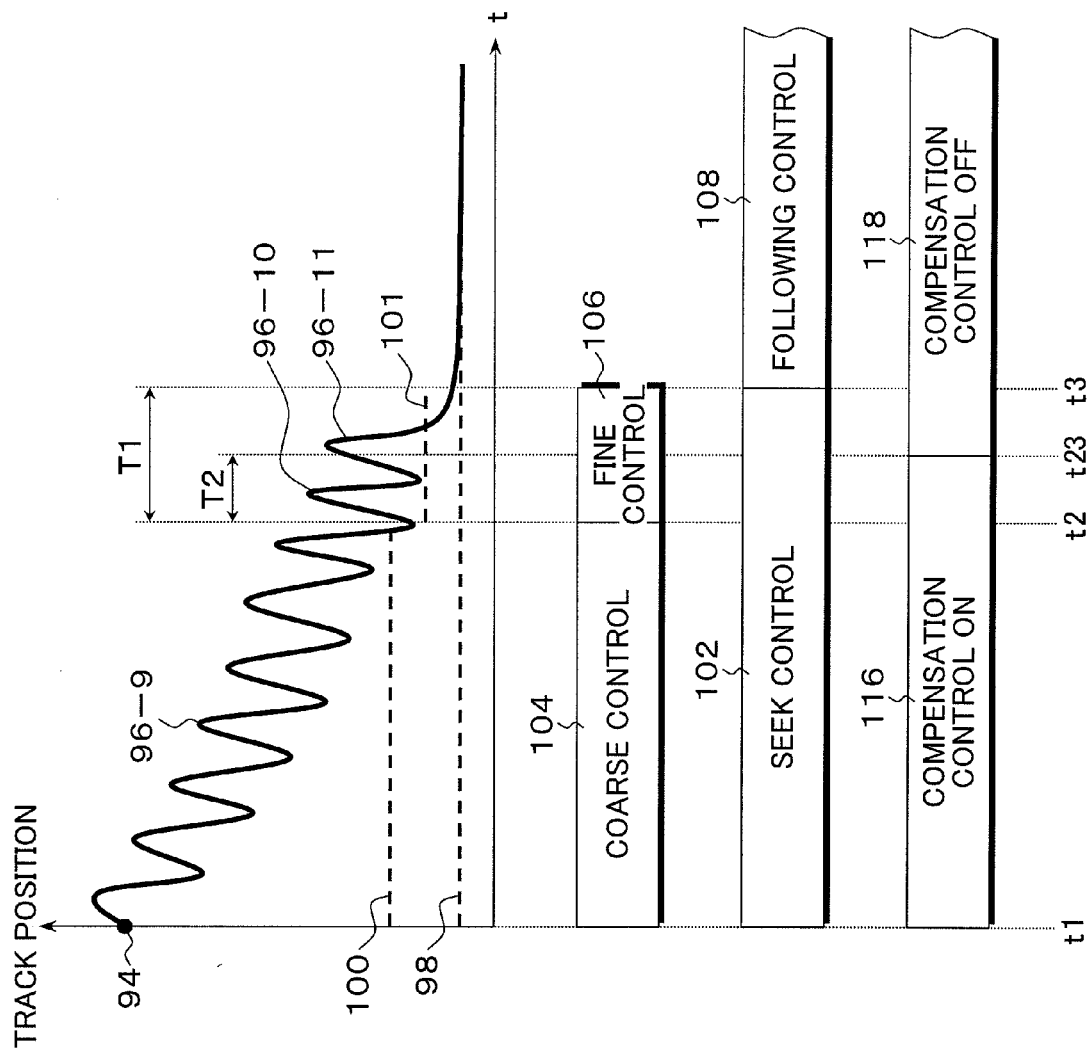

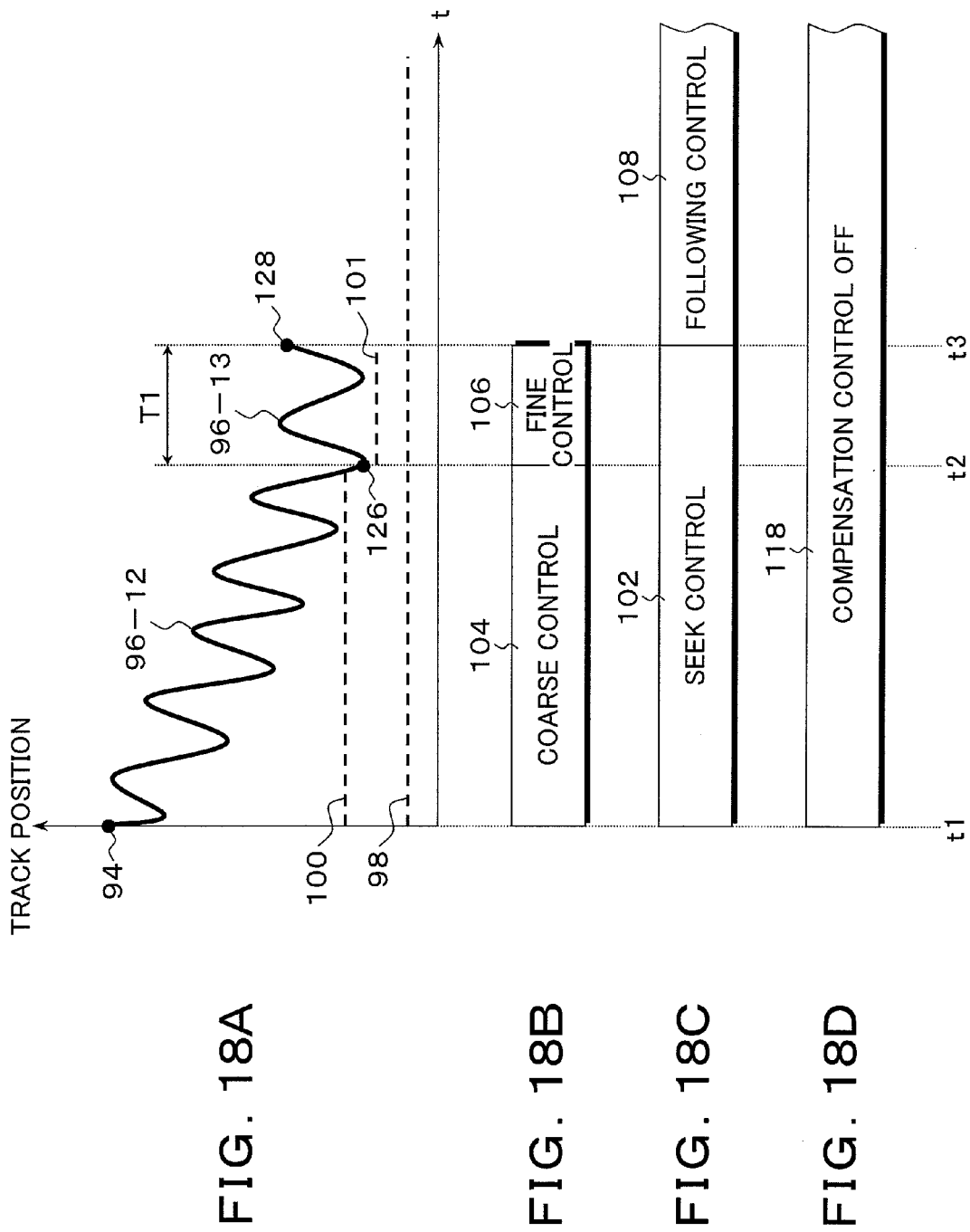

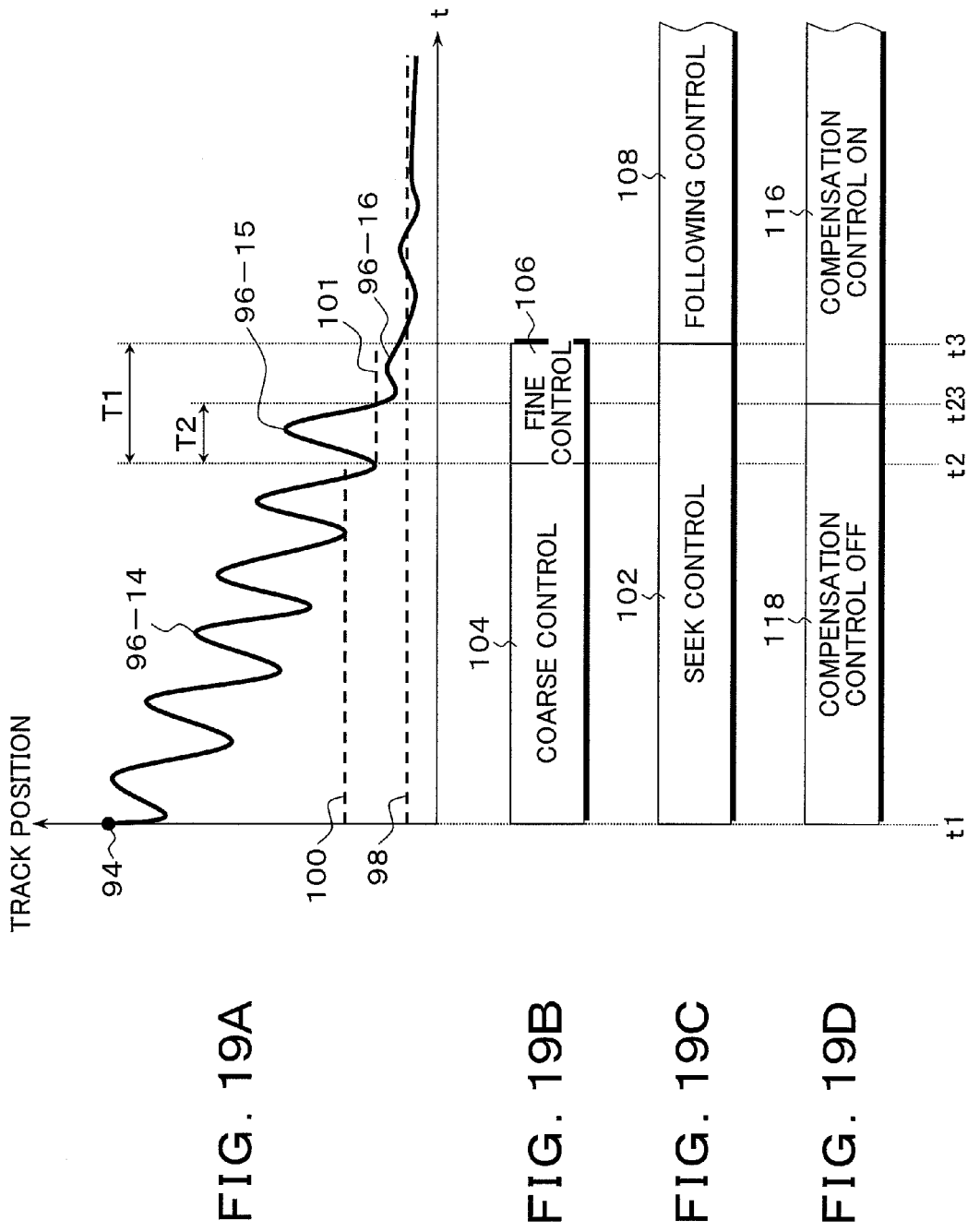

STORAGE APPARATUS, CONTROL METHOD, AND CONTROL DEVICE OF STORAGE APPARATUS

This application is a priority based on prior application No. JP 2007-197282, filed Jul. 30, 2007, in Japan.

BACKGROUND OF THE INVENTION

1. Field of the Invention

The present invention relates to a storage apparatus such as a magnetic disk apparatus, control method, and storage control circuit which subject a head to seek control to a target track of a storage medium and positions it thereon and, particularly, relates to the storage apparatus, control method, and control device which perform seek control while compensating for rotation disturbance vibrations applied to the apparatus.

2. Description of the Related Arts

Conventionally, in a magnetic disk apparatus, when a read command or a write command is received from a host, seek control in which a head is positioned from a current track position to a target track of a magnetic disk specified by the command is performed by driving a rotary actuator by a voice coil motor. The seek control can be divided into coarse control (rough control) and fine control (precise control). In the coarse control, a target velocity pattern which increases the velocity, keeps a constant velocity, and reduces the velocity according to the number of remaining tracks from the current track to the target track is generated, and velocity control is performed so that the head moving velocity follows the target velocities; and, at the point when it is in the vicinity of the target track, it is switched to the fine control. More specifically, when the number of remaining tracks reaches a predetermined value during the velocity control following the target velocities, it is switched to the fine control if the condition that the head position is within the range of fine switch slice with respect to the target track is satisfied. At this point, if the head is out of the predetermined range of fine switch slicing set for the target track, a seek error (hereinafter, referred to as a "coarse seek error") is determined, the head is returned to a starting track, and seek retry in which seek control is performed again is performed. The fine control is stabilization control (settling control) for making a transition to following control by leading the head position signal demodulated from servo information of the magnetic disk to a target track center. Regarding the fine control, predetermined settling time and fine completion slices are set, seek completion is determined and transition to following control is made if the head position is within the range of the fine completion slices when settling time is elapsed, and an on-track flag is set so that a read operation or a write operation based on the command can be executed. If the head position is out of the range of the fine completion slices when the settling time is elapsed, it is considered to be a seek error (hereinafter, referred to as a "fine seek error") due to time out of the settling time, the head is returned to the starting track, and a seek retry in which seek control is performed again is performed as well as the case of the coarse seek error in the coarse control. However, in the usage environment of a magnetic disk apparatus, it is housed in a rack of, for example, a server or a storage system; therefore, it is affected by the vibrations of a fan or another magnetic disk apparatus. These vibrations physically vibrate the rotary actuator, and the vibrations appear as disturbance in the head position signal. The vibrations applied to the magnetic disk apparatus include translation vibrations and distortion vibrations. The translation vibrations are the vibrations that move the entire apparatus in one direction and do not affect head positioning since the rotary actuator is also integrally vibrated. On the other hand, the distortion vibrations are the vibrations that move the entire apparatus in a rotating direction about a certain position, are the vibrations that move the rotary actuator, which is rotatably supported by a pivot shaft, in the rotating direction, and serve as disturbance that causes a head positioning error; and these are referred to as rotation disturbance vibrations. In order to eliminate deterioration of the positioning accuracy due to such rotation disturbance vibrations, in a conventional magnetic disk apparatus, an acceleration velocity sensor that detects disturbance vibrations is provided, and feed forward control of canceling them out by adding a servo compensation signal proportional to the output of the acceleration velocity sensor to a seek control servo system is performed, thereby reducing the head positioning error caused due to foreign vibrations even when unexpected rotation disturbance vibrations are applied from outside (JP63-213176). Such disturbance vibrations are also applied to the seek control, in which the head is moved and positioned to a target track, as disturbance and deteriorate the positioning accuracy of the seek control. Therefore, the servo compensation signal detected by the acceleration velocity sensor is added also to a seek control system so as to cancel out the disturbance vibrations, thereby reducing the positioning error of the seek control.

However, in the conventional rotation disturbance compensation control using the acceleration velocity sensor, the signals output from the acceleration velocity sensor contain noise components due to factors other than rotation disturbance vibrations in some cases, and there is a problem that the positioning accuracy of the seek control is deteriorated due to the influence of the noise components contained in the compensation signal of the rotation disturbance vibrations added to the seek control system. More specifically, the acceleration velocity sensor used in the rotation disturbance compensation control is expected to detect rotation disturbance vibrations in the disk surface (X-Y plane) of the magnetic disk apparatus; however, in practice, the output of the acceleration velocity sensor contains power source ripple noise or disturbance components other than rotation disturbance vibrations due to translation vibration in the direction (Z direction) orthogonal to the disk surface, an inappropriate sensor signal is fed forward to the seek control system as a result, and the control accuracy is deteriorated, which is a problem. Moreover, there is also a problem that, even in a normal case in which disturbance vibrations or noise are not applied to the acceleration velocity sensor, the sensor signal contains noise components due to the influence of the S/N ratio of the acceleration velocity sensor itself, and the control accuracy is deteriorated when such sensor signal is fed forward to the seek control system.

SUMMARY OF THE INVENTION

According to the present invention to provide a storage apparatus, control method, and storage control circuit which can reliably prevent deterioration of the control accuracy in seek control even when the signal from the acceleration velocity sensor contains foreign noise such as translation disturbance vibration components and power source ripples or the noise due to the S/N ratio of the sensor itself.

(Apparatus)

The present invention provides a storage apparatus. The storage apparatus of the present invention is characterized by having a seek control unit which moves a head to a vicinity of a target track of a storage medium by coarse control (rough control) of a rotary actuator and then switches the control to fine control (precise control) so as to position the head to the target track;

a rotation disturbance compensation control unit which adds a rotation disturbance vibration detection signal detected based on an acceleration velocity sensor to the seek control unit as a compensation signal so as to cancel out a rotation disturbance component; and a compensation control switching unit which sets the rotation disturbance compensation control unit to be either enabled or disabled, switches the enabling or disabling setting state of the rotation disturbance compensation control unit to the opposite setting state when a coarse seek error, in which the head position is out of a predetermined fine switch error range with respect to the target track, is determined at the end of the coarse control by the seek control unit, and causes the seek control unit to perform seek again.

Furthermore, when a fine seek error, in which the head position is not moved into a predetermined fine completion error range with respect to the target track, is determined even when predetermined time is elapsed during the fine control by the seek control unit, the compensation control switching unit switches the enabling or disabling setting state of the rotation disturbance compensation control unit to the opposite setting state and continues the fine control.

The compensation control switching unit turns on the compensation signal to be added to the seek control unit when the rotation disturbance compensation control unit is to be enabled and turns off the compensation signal to be added to the seek control unit when the rotation disturbance compensation control unit is to be disabled.

The compensation control switching unit adjusts the compensation signal to be added to the seek control unit by multiplying the signal by a predetermined gain when the rotation disturbance compensation control unit is to be enabled and turns off the compensation signal to be added to the seek control unit when the rotation disturbance compensation control unit is to be disabled.

The rotation disturbance compensation control unit detects a differential signal of acceleration velocity detection signals from a pair of acceleration velocity sensors as the rotation disturbance vibration detection signal.

Another mode of the present invention is characterized by having a seek control unit which moves a head to a vicinity of a target track of a storage medium by coarse control (rough control) of a rotary actuator and then switches the control to fine control (precise control) so as to position the head to the target track;

a rotation disturbance compensation control unit which adds a rotation disturbance vibration detection signal detected based on an acceleration velocity sensor to the seek control unit as a compensation signal so as to cancel out a rotation disturbance vibration component; and a compensation control switching unit which sets the rotation disturbance compensation control unit to be either enabled or disabled, switches the enabling or disabling setting state of the rotation disturbance compensation control unit to the opposite setting state when a fine seek error, in which the head position is not moved into a predetermined fine completion error range with respect to the target track, is determined even when predetermined time is elapsed during the fine control, and continues the fine control.

(Control Method of Storage Apparatus)

The present invention provides a control method of a storage apparatus. The control method of the storage apparatus according to the present invention is characterized by including a seek control step of moving a head to a vicinity of a target track of a storage medium by coarse control (rough control) of a rotary actuator and then switching the control to fine control (precise control) so as to position the head to the target track;

a rotation disturbance compensation control step of adding a rotation disturbance vibration detection signal detected based on an acceleration velocity sensor to the seek control step as a compensation signal so as to cancel out a rotation disturbance component; and a compensation control switching step of setting the rotation disturbance compensation control step to be either enabled or disabled, switching the enabling or disabling setting state of the rotation disturbance compensation control step to the opposite setting state when a coarse seek error, in which the head position is out of a predetermined fine switch error range with respect to the target track, is determined at the end of the coarse control by the seek control step, and causes the seek control step to perform seek again.

Furthermore, when a fine seek error, in which the head position is not moved into a predetermined fine completion error range with respect to the target track, is determined even when predetermined time is elapsed during the fine control by the seek control step, the compensation control switching step switches the enabling or disabling setting state of the rotation disturbance compensation control step to the opposite setting state and continues the fine control.

Another mode of the control method of the storage apparatus according to the present invention is characterized by including a seek control step of moving a head to a vicinity of a target track of a storage medium by coarse control (rough control) of a rotary actuator and then switching the control to fine control (precise control) so as to subject the head to seek control to the target track;

a rotation disturbance compensation control step of adding a rotation disturbance vibration detection signal detected based on an acceleration velocity sensor to the seek control step as a compensation signal so as to cancel out a rotation disturbance vibration component; and a compensation control switching step of setting the rotation disturbance compensation control step to be either enabled or disabled, switching the enabling or disabling setting state of the rotation disturbance compensation control step to the opposite setting state when a fine seek error, in which the head position is not moved into a predetermined fine completion error range with respect to the target track, is determined even when predetermined time is elapsed during the fine control by the seek control step, and continues the fine control.

(Storage Control Circuit)

The present invention provides a storage control circuit. The storage control circuit of the present invention is characterized by having a seek control unit which moves a head to a vicinity of a target track of a storage medium by coarse control (rough control) of a rotary actuator and then switches the control to fine control (precise control) so as to position the head to the target track;

a rotation disturbance compensation control unit which adds a rotation disturbance vibration detection signal detected based on an acceleration velocity sensor to the seek control unit as a compensation signal so as to cancel out a rotation disturbance vibration component; and a compensation control switching unit which sets the rotation disturbance compensation control unit to be either enabled or disabled, switches the enabling or disabling setting state of the rotation disturbance compensation control unit to the opposite setting state when a coarse seek error, in which the head position is out of a predetermined fine switch error range with respect to the target track, is determined at the end of the coarse control by the seek control unit, and causes the seek control unit to perform seek again.

Furthermore, when a fine seek error, in which the head position is not moved into a predetermined fine completion error range with respect to the target track, is determined even when predetermined time is elapsed during the fine control by the seek control unit, the compensation control switching unit switches the enabling or disabling setting state of the rotation disturbance compensation control unit to the opposite setting state and continues the fine control.

Another mode of the storage control circuit according to the present invention is characterized by having a seek control unit which moves a head to a vicinity of a target track of a storage medium by coarse control (rough control) of a rotary actuator and then switches the control to fine control (precise control) so as to position the head to the target track;

a rotation disturbance compensation control unit which adds a rotation disturbance vibration detection signal detected based on an acceleration velocity sensor to the seek control unit as a compensation signal so as to cancel out a rotation disturbance vibration component; and a compensation control switching unit which sets the rotation disturbance compensation control unit to be either enabled or disabled, switches the enabling or disabling setting state of the rotation disturbance compensation control unit to the opposite setting state when a fine seek error, in which the head position is not moved into a predetermined fine completion error range with respect to the target track, is determined even when predetermined time is elapsed during the fine control by the seek control unit, and continues the fine control.

According to the present invention, during the coarse control in which the rotation disturbance vibration compensation unit is on and the compensation signal is added to the seek control system, when the rotation disturbance vibration detection signal detected based on the acceleration velocity sensors contain unintended translation disturbance vibration components, foreign noise such as power source ripple noise, and noise caused by the S/N ratio of the sensor itself, and even when such unintended noise is fed forward to the seek control system during coarse control as the compensation signal and a coarse seek error, in which the head cannot reach the fine switch slice, is caused, turning off the rotation disturbance compensation control unit and performing retry seek of performing seek again can prevent occurrence of the seek error caused by the unintended noise contained in the rotation disturbance vibration detection signal, can eliminate the seek error by one seek retry so as to reliably perform switch to the fine control, can enhance the positioning accuracy of the seek control, and can reduce the seek time.

Reversely, in the case in which the coarse seek error occurs in the coarse control in which the rotation disturbance compensation control unit is turned off, when the rotation disturbance compensation control unit is turned on and seek retry is then performed, the coarse control in which the intended rotation disturbance vibration components are cancelled out by the compensation signal is performed, the seek error is eliminated by one seek retry so as to reliably perform switch to the fine control, the positioning accuracy of the seek control is enhanced, and the seek time can be reduced.

Furthermore, when a fine seek error, in which the head cannot reach the fine completion slice, occurs during the predetermined settling time after it is switched to the fine control, the rotation disturbance compensation control unit is switched to be off if it is on and the fine control is continued, or if the rotation disturbance compensation control unit is off, reversely, it is switched to be on and the fine control is continued. As a result of switching the enabling or disabling setting state of the rotation disturbance compensation control unit which is the cause of the error during the fine control to the opposite setting state, the settling conditions are cleared, the transition to the following control can be reliably made without causing the fine seek error, and the seek time can be reduced. The above and other objects, features, and advantages of the present invention will become more apparent from the following detailed description with reference to the drawings.

BRIEF DESCRIPTION OF THE DRAWINGS

FIGS. 1A and 1B are block diagrams showing an embodiment of a magnetic disk apparatus to which the present invention is applied;

FIG. 8 is a block diagram showing a functional configuration of a seek control system and a rotation disturbance compensation control system in the present embodiment;

FIGS. 9A to 9C are time charts showing seek control in a normal case in the present embodiment;

FIGS. 10A to 10C time charts showing the case in which a seek error occurs upon transition from coarse control to fine control;

FIGS. 11A to 11C are time charts showing the case in which a seek error occurs upon transition from fine control to following control;

FIGS. 12A to 12D are time charts showing the case in which a seek error occurs upon transition from coarse control to fine control in the state in which rotation disturbance compensation control is on;

FIGS. 13A to 13D are time charts showing retry seek control performed when rotation disturbance compensation control is off after the seek error of FIGS. 12A to 12D;

FIGS. 14A to 14D are time charts showing the case in which a seek error occurs upon transition from coarse control to fine control in the state in which rotation disturbance compensation control is off;

FIGS. 15A to 15D are time charts showing seek retry control performed when rotation disturbance compensation control is on after the seek error of FIGS. 14A to 14D;

FIGS. 16A to 16D are time charts showing the case in which a seek error occurs upon transition from fine control to following control in the state in which rotation disturbance compensation control is on;

FIGS. 17A to 17D are time charts showing the case in which rotation disturbance compensation control is switched from on to off during fine control;

FIGS. 18A to 18D are time charts showing the case in which a seek error occurs upon transition from fine control to following control in the state in which rotation disturbance compensation control is off;

FIGS. 19A to 19D are time charts showing control of the present embodiment in which rotation disturbance compensation control is switched from off to on during fine control.

DETAILED DESCRIPTION OF THE PREFERRED EMBODIMENTS

Figure 2:
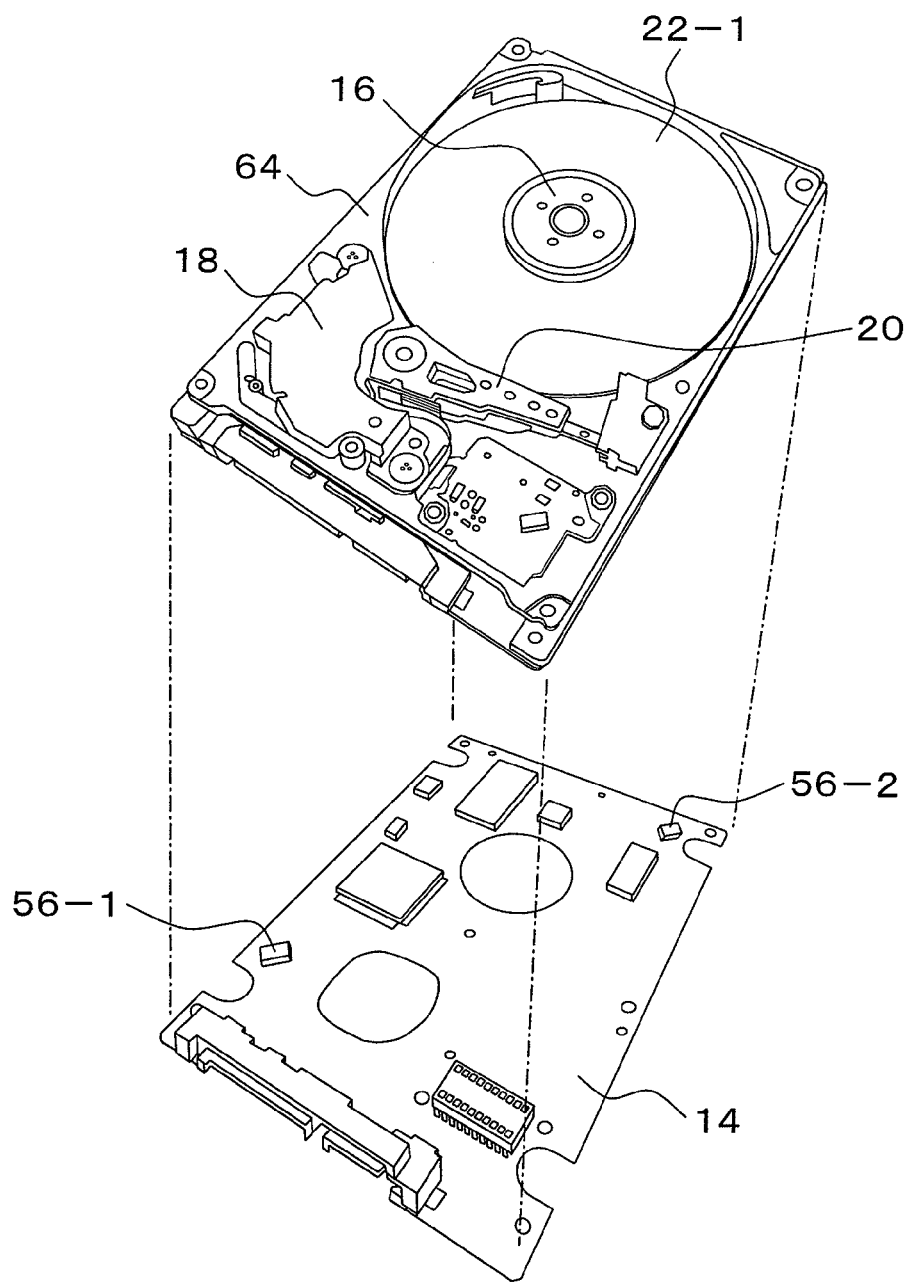
FIG. 2 is an explanatory drawing showing an internal structure of the present embodiment and locations of acceleration velocity sensors with respect to a control board.

FIGS. 1A and 1B are block diagrams showing an embodiment of a magnetic disk apparatus to which the present invention is applied. In FIGS. 1A and 1B, the magnetic disk apparatus 10, which is known as a hard disk drive (HDD) is composed of a disk enclosure 12 and a control board 14. A spindle motor 16 is provided in the disk enclosure 12, and magnetic disks (storage media) 22-1 and 22-2 are attached to a rotating shaft of the spindle motor 16 and rotated at a constant rotating speed, for example, 4200 rpm. In addition, a voice coil motor 18 is provided in the disk enclosure 12; and the voice coil motor 18 drives a rotary actuator 20 and performs positioning of heads with respect to the recording surfaces of the magnetic disks 22-1 and 22-2 of the heads 24-1 to 24-4 supported at distal ends of an arm. The heads 24-1 to 24-4 are complex-type heads in which recording elements and reading elements are integrated. The recording element uses an in-plane magnetic recording type recording element or a perpendicular magnetic recording type recording element. In the case of the recording element of a perpendicular magnetic recording type, for example, perpendicular storage media having recording layers and soft magnetic backing layers are used as the magnetic disks 22-1 and 22-2. A GMR element or a TMR element is used as the reading element. The heads 24-1 to 24-4 are connected to a head IC 26 by signal lines, and the head IC 26 selects one of the heads according to a head select signal based on a write command or a read command from a host serving as an higher-level apparatus and performs a write or a read. In addition, in the head IC 26, a write driver is provided for a write system, and a pre-amplifier is provided for a read system. An MPU 28 is provided in the control board 14; and, with respect to a bus 30 of the MPU 28, a memory 31 which uses a RAM and stores a control program (firmware program) and control data and a non-volatile memory 32 which uses a flash memory or the like and stores a control program (firmware program) are provided. In addition, with respect to the bus 30 of the MPU 28, a host interface control unit 34, a buffer memory control unit 36 which controls the buffer memory 38, a hard disk controller 40 which functions as a formatter, a read channel 42 which functions as a write modulation unit and a read demodulation unit, and a motor drive control unit 44 which controls the voice coil motor 18 and the spindle motor 16 are provided. In addition, as a function realized by executing a control program (firmware program), a seek control unit 50 is provided in the MPU 28. A coarse control unit 52 and a fine control unit 54 are provided in the seek control unit 50. Note that, depending on the mounting area of the control board 14, the MPU 28, the host interface control unit 34, the buffer memory control unit 36, the hard disk controller 40, and the read channel 42 which are storage control circuits can be built as individual LSI circuits; alternatively, for example, plural ones such as the MPU 28, the hard disk controller 40, and the read channel 42 can be selected so as to built them as one LSI circuit. The MPU 28 performs writing processes and reading processes based on commands from the host. Normal operations in the magnetic disk apparatus 10 will be described below. When a write command and write data from the host are received by the host interface control unit 34, the write command is decoded by the MPU 28, and the received write data is stored in the buffer memory 38 in accordance with needs. Then, it is converted into a predetermined data format by the hard disk controller 40, an ECC code is added thereto by ECC encoding processing, and scrambling, RLL code conversion, and write compensation are performed in the write modulation system in the read channel 42. Then, it is written to the magnetic disk 22-1 from the write amplifier via the head IC 26 and from the recording element of, for example, the selected head 24-1. In the process of writing the write data to the magnetic disk 22-1, a head positioning signal is given from the MPU 28 to the motor drive control unit 44, the head undergoes seek control to a target track specified by the command by driving the rotary actuator 20 by the voice coil motor 18, and following control of positioning the head to a track center is performed. Specifically, servo information is recorded on the magnetic disk 22-1 in the circumferential direction thereof at constant angle intervals, and the servo information read by the head 24-1 is demodulated by a signal processing unit 46 provided in the read channel 42. Then, the head position is detected by a position detection unit 48 provided in the hard disk controller 40, a head positioning signal is given from the MPU 28 to the motor drive control unit 44, the rotary actuator 20 is driven by driving the voice coil motor 18 by the VCM driver 55 so as to cause the head to seek control to the target track specified by the command, and then it is placed on the track so as to perform following subordinate control. The position detection unit 48 may be realized as a function MPU 28. In further detail, in the seek control unit 50 provided in the MPU 28, the coarse control unit 52 moves the head to a position in the vicinity of the target track specified by the write command by driving the rotary actuator 20 by the voice coil motor 18. The coarse control unit 52 generates a target velocity pattern that increases the velocity, keeps a constant velocity, and reduces the velocity in accordance with the number of remaining tracks from the current track to the target track, controls the velocity so that the head moving velocity follows the target velocities, and switches it to fine control of the fine control unit 54 at the point when it is in the vicinity of the target track. The coarse control, which is the velocity control, is the control that does not have integral elements in the control system. In the switching from the coarse control unit 52 to the fine control unit 54, when the number of remaining tracks reaches a predetermined value during the velocity control following the target velocities, it is switched to the fine control unit 54 if the condition that the head position is within the range of fine switch slice with respect to the target track is satisfied. In this process, when the head position is out of the range of the fine switch slicing, a coarse seek error is determined, the head is returned to the starting track, and a seek retry in which seek control is performed again is performed. The fine control unit 54 performs stabilization control (settling control) that connects the coarse control to the following control, and this is a position control that leads the head position to a center position of the target track, wherein the control system contains integral elements. After it is switched to the fine control unit 54, if it is within a predetermined fine completion slice range with respect to the target track when predetermined settling time T1 is elapsed, a transition to the following control that causes the head position to follow the target track center is made, an on-track flag is set, and writing or reading of the magnetic disk is enabled. Meanwhile, when a read command from the host is received by the host interface control unit 34, the read command is decoded by the MPU 28, and read signals read by the reading element of the head, which is selected by head selection of the head IC 26, are amplified by the pre-amplifier. Then, they are input to a read demodulation system of the read channel 42, read data is demodulated by partial response maximum likelihood (PRML) detection or the like, and errors are corrected by performing ECC decoding processing by the hard disk controller 40. Then, they are subjected to buffering to the buffer memory 38, and the read data is transferred to the host from the host interface control unit 34. Furthermore, in the control board 14 in the magnetic disk apparatus 10 of the present embodiment, in order to compensate for the head position errors due to rotation disturbance vibrations applied to the apparatus upon the seek control, a pair of acceleration velocity sensors 56-1 and 56-2, a rotation disturbance vibration detection unit 58, and a rotation disturbance compensation control unit 60 and a compensation control switching unit 62 which are functions realized by executing the programs of the MPU 28 are provided. The rotation disturbance compensation control unit 60 performs feed forward control by applying a compensation signal to the seek control unit 50 so that the rotation disturbance vibration components, which are detected by the acceleration velocity sensors 56-1 and 56-2 and the rotation disturbance vibration detection unit 58 and are applied to the magnetic disk apparatus 10, are cancelled out. The compensation control switching unit 62 initially sets the rotation disturbance compensation control unit 60 to be enabled or disabled upon start-up caused along with power-on of the magnetic disk apparatus 10 and, when a coarse seek error that it is not in the predetermined fine switch slice range with respect to the target track is determined when the coarse control by the coarse control unit 52 provided in the seek control unit 50 is finished, switches the enabling or disabling setting state of the rotation disturbance compensation control unit 60 to the opposite setting state and causes the seek control unit 50 to perform seek again. Furthermore, when a fine seek error in which the head is not moved to the predetermined fine completion slice error range with respect to the target track even when, for example, predetermined time T2 set as half of the settling time T1 is elapsed is determined during fine control by the fine control unit 60 provided in the seek control unit 50, the compensation control switching unit 62 switches the enabling or disabling setting state of the rotation disturbance compensation control unit 60 at that point to the opposite setting state and continues the fine control. Herein, enabling the rotation disturbance compensation control unit 60 means to perform feed forward control by adding the compensation signal generated by the rotation disturbance compensation control unit 54 to the seek control unit 50. On the other hand, disabling the rotation disturbance compensation control unit 60 means not to perform the feed forward control without adding the compensation signal generated by the rotation disturbance compensation control unit 60 to the seek control unit 50. Specifically, a switch provided in the path for adding the compensation signal from the rotation disturbance compensation control unit 60 to the seek control unit 50 is turned on upon enabling and turned off upon disabling. Alternatively, without using the on/off switching of the switch, the gain of the compensation signal fed from the rotation disturbance compensation control unit 60 to the seek control unit 50 may be adjusted. When the rotation disturbance compensation control unit 60 is to be enabled, gain=1 is set, and the compensation signal is added to the seek control unit 50 without change. This is equivalent to turning on the switch that adds the compensation signal to the seek control unit 50. When the rotation disturbance compensation control unit 60 is to be disabled, gain=0 is set, and the compensation signal to be added to the seek control unit 50 is caused to be zero. This is equivalent to turning off the switch that adds the compensation signal to the seek control unit 50. Furthermore, regarding the gain setting of the case when the rotation disturbance compensation control unit 60 is to be enabled, other than setting gain=1, the gain may be adjusted within the range of more than 0 and less than 1 or the range more than 1 in accordance with needs. Therefore, enabling the rotation disturbance compensation control unit 60 also means to multiply the compensation signal by a predetermined gain.

FIG. 2 is an explanatory drawing showing an internal structure of the present embodiment and locations of the acceleration velocity sensors with respect to the control board. In FIG. 2, in the magnetic disk apparatus of the present embodiment, the magnetic disks 22-1 and 22-2 (not shown) which are rotated at a constant velocity by the spindle motor 16 are disposed on a base 64. With respect to the magnetic disks 22-1 and 22-2, the rotary actuator 20, which is rotatably supported by a pivot shaft, is disposed, and the distal ends supports the heads. The voice coil motor 18 is disposed in the opposite side of the head-attached side of the rotary actuator 20. The voice coil motor 18 is composed of a coil attached in the rotary actuator 20 side and yokes which are attached to a permanent magnet fixed to the base 64 side and are disposed in the upper and lower sides. The control board (circuit board) 14 is disposed in the rear side of the base 64, and, as exploded and shown in the lower side, the pair of acceleration velocity sensors 56-1 and 56-2 are disposed at, for example, corner portions in a diagonal direction capable of ensuring a longest installation distance. The acceleration velocity sensors 56-1 and 56-2 use piezoelectric elements as detection elements, for example, piezo resistance elements and output acceleration velocity detection signals of the levels corresponding to the magnitude of the acceleration velocities in the polarity corresponding to the direction of the acceleration velocity applied to the sensor.

Figure 3:
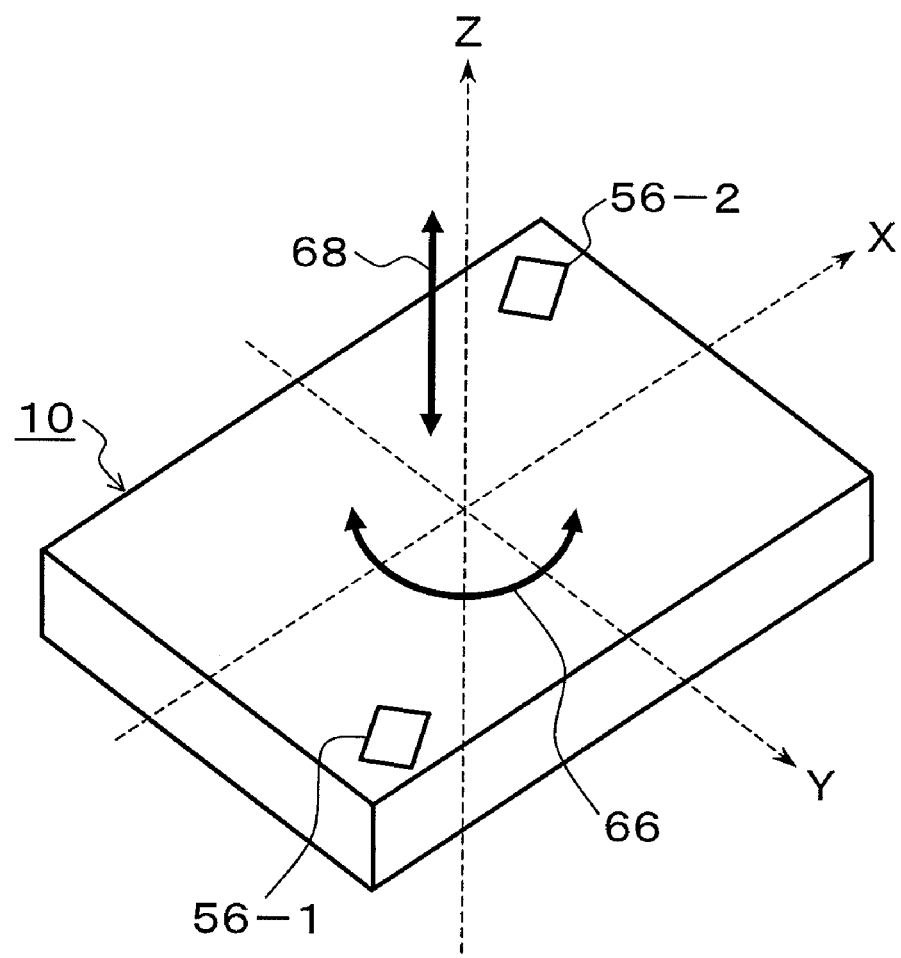
FIG. 3 is an explanatory drawing showing rotation disturbance vibration and translation disturbance vibration applied to the present embodiment.

FIG. 3 is an explanatory drawing showing rotation disturbance vibrations and translation disturbance vibrations applied to the present embodiment. In FIG. 3, in the magnetic disk apparatus 10, the pair of acceleration velocity sensors 56-1 and 56-2 are installed at corner portions in the diagonal direction of the control board as shown in FIG. 2. Herein, an X axis and a Y axis are set in the plane along the magnetic disk medium surface of the magnetic disk apparatus 10 so as to provide an XY plane, and the height direction orthogonal to the XY plane is a Z axis. With respect to the magnetic disk apparatus 10 for which such three-dimensional coordinates are supposed to be present, disturbance vibrations that generate detection outputs in the acceleration velocity sensors 56-1 and 56-2 include rotation disturbance vibrations 66 applied to the XY planed and translation disturbance vibrations 68 applied in the Z-axis direction. In the present embodiment, the rotation disturbance vibrations 66 are detected by the acceleration velocity sensors 56-1 and 56-2 so as to compensate for the position error of the seek control; however, other than the rotation disturbance vibrations 66, acceleration velocity components caused by the translation disturbance vibrations 68 in the Z-axis direction are also output from the acceleration velocity sensors 56-1 and 56-2. The output of the acceleration velocity sensors 56-1 and 56-2 caused by the translation disturbance vibrations 68 are irrelevant to the rotation disturbance vibrations 66, which are originally intended to be compensated for; therefore, when these are added to the seek control unit 50 as a compensation signal, the position error is reversely increased, and a seek error occurs. Other than this, the components which are contained in the acceleration velocity detection signals output from the acceleration velocity sensors 56-1 and 56-2 and increase the position error include foreign noise such as power source ripple noise and the noise caused by the S/N ratios of the sensors itself of the acceleration velocity sensors 56-1 and 56-2.

Figure 4:
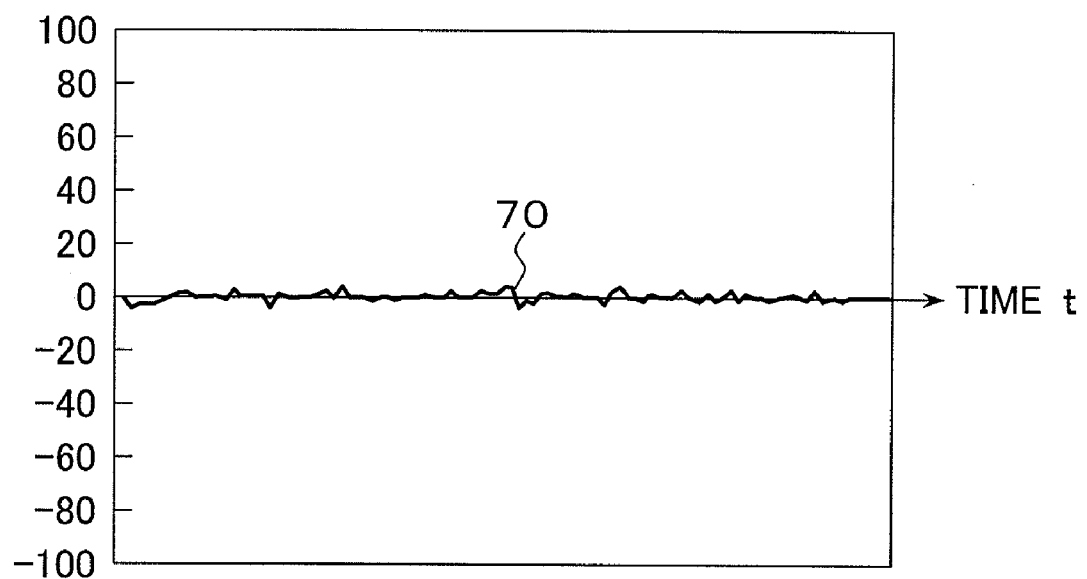
FIG. 4 is a time chart showing disturbance vibration detection signal in a normal case.

FIG. 4 is a time chart showing an acceleration velocity detection signal obtained from a differential signal of the acceleration velocity censor 56-1 and the acceleration velocity sensor 56-2 in a normal case in the present embodiment. The acceleration velocity detection signal 70 of the normal case is basically flat since no acceleration velocity is generated; however, minute noise caused by the S/N ratios of the sensors itself is randomly contained. When a compensation signal having this noise is applied to the seek control unit 50, it causes deterioration of the position accuracy.

Figure 5:
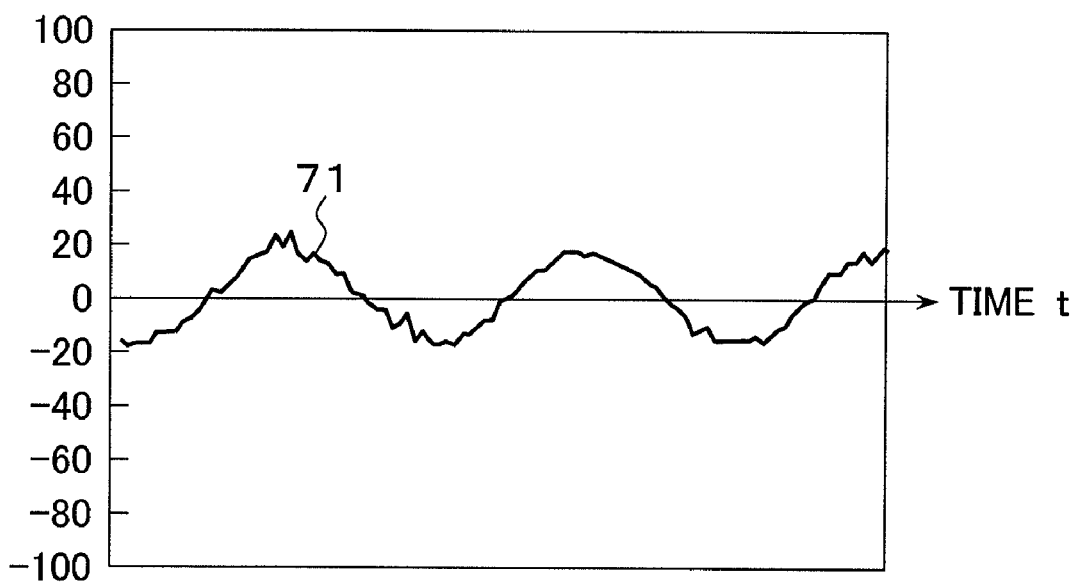
FIG. 5 is a time chart showing an acceleration velocity detection signal of the case in which rotation disturbance vibration is added.

FIG. 5 is a time chart showing an acceleration velocity detection signal 71 of the acceleration velocity sensor 56-1 of the case in which the rotation disturbance vibrations 66 around the XY plane of the magnetic disk apparatus 10 shown in FIG. 3 are added. These rotation disturbance vibrations are the acceleration velocity components which are detection objects in the present embodiment. When feed forward control is performed by adding a compensation signal based on the acceleration velocity detection signal 71 containing the rotation disturbance vibrations to the seek control unit 50, the rotation disturbance vibrations can be cancelled out, thereby enhancing the positioning accuracy in the seek control.

Figure 6:
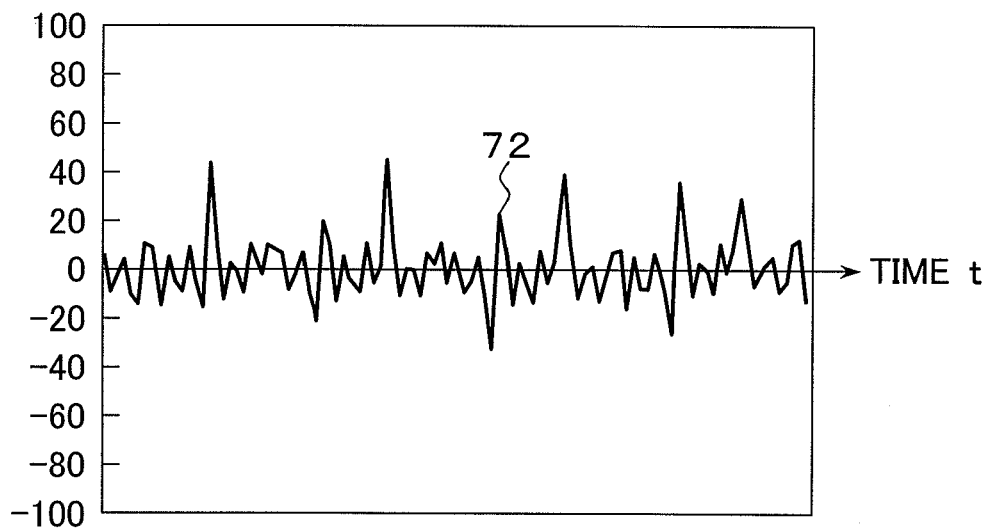
FIG. 6 is a time chart showing an acceleration velocity detection signal of the case in which power source ripple noise is added.

FIG. 6 is a time chart showing an acceleration velocity detection signal 72 of the acceleration velocity sensor 56-1 in the present embodiment of the case in which power source ripple noise is added. When a compensation signal based on the acceleration velocity detection signal 72 containing the power source ripple noise is added to the seek control unit 50, since it is the noise component totally irrelevant to the rotation disturbance vibration component, rotation disturbance vibration compensation is not performed, and the seek positioning accuracy is deteriorated.

Figure 7:
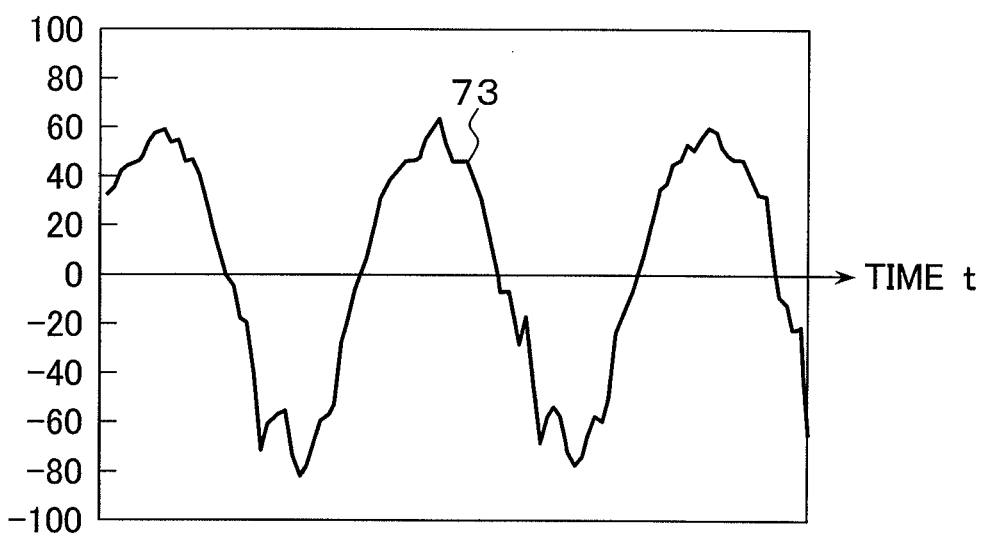
FIG. 7 is a time chart showing an acceleration velocity detection signal of the case in which translation disturbance vibration in a Z direction is added.

FIG. 7 is a time chart showing an acceleration velocity detection signal 73 obtained from a differential signal of the acceleration velocity sensor 56-1 and the acceleration velocity sensor 56-2 in the present embodiment in the case in which the translation disturbance vibrations 68 in the Z-axis direction shown in FIG. 3 are added. The disturbance vibrations in the Z-axis direction are different from the rotation disturbance vibrations of FIG. 5 which are intended to be detected by the velocity acceleration sensors of the present embodiment, and it is the signal that does not serve as a compensation object. However, due to the disposition structures of the piezoelectric elements built in the acceleration velocity sensors 56-1 and 56-2, the acceleration velocity detection signal 73 having large variation corresponding to the acceleration velocity variation of the translation disturbance vibrations is output. When this is added to the seek control unit 50 without change so as to perform feed forward control, the positioning accuracy is largely deteriorated. In the present embodiment, when a seek error occurs in the state in which the rotation disturbance compensation control unit 60 is enabled and a compensation signal is added to the seek control unit 50, the acceleration velocity detection signal of this case is determined to have caused the seek error due to the noise of the sensors itself, the foreign noise such as power source ripple noise, or the translation vibration components in the Z-axis direction shown in FIG. 4, FIG. 6, and FIG. 7, the rotation disturbance compensation control unit 60 is disabled, and a seek retry process is executed. On the other hand, when a seek error occurs in the state in which the rotation disturbance compensation control unit 60 is disabled and the compensation signal is not added to the seek control unit 50, the acceleration velocity detection signal of this case is determined to have caused the seek error without performing the compensation control using the acceleration velocity detection signal according to the rotation disturbance vibrations of FIG. 5, the rotation disturbance compensation control unit 60 is enabled, and a seek retry process is executed.

FIG. 8 is a block diagram showing a functional configuration of a seek control system and a rotation disturbance compensation control system in the present embodiment. In FIG. 8, the seek control system 50-1 is composed of a head 24, a position signal demodulation unit 74, the coarse control unit 52, the fine control unit 54, adder units 76 and 78, a selector 80, the VCM driver 55, and the VCM 18. Herein, the coarse control unit 52, the fine control unit 54, the adder units 76 and 78, and the selector 80 are included in the functions of the seek control unit 50 provided in the MPU 28 of FIGS. 1A and 1B including the function of a controller 88, which will be described later, and are the functions realized by executing firmware programs by the MPU 28. The position signal demodulation unit 74 is a combination function of the signal processing unit 46 provided in the read channel 42 of FIGS. 1A and 1B and the position detection unit 48 provided in the hard disk controller 40 and demodulates a head position signal from the servo information obtained from the reading element of the head 24. In the controller 88 which is a function realized by executing a firmware program by the MPU 28 of FIGS. 1A and 1B corresponding to the seek control system 50-1, a seek processing unit 90 and a seek retry processing unit 92 are provided. First, the seek processing unit 90 operates the coarse control unit 52 with respect to a target track specified by a write command or a read command from the host and moves the head to a front position where the number of remaining tracks to the target track is a predetermined number by velocity control of the rotary actuator by the VCM 18. Specifically, the coarse control unit 52 generates a target velocity profile pattern for velocity control that increases the velocity, reduces the velocity, and reduces the velocity based on the track difference (remaining number of tracks) between a start track position where the head is currently positioned and a target track position, drives the VCM 18 so as to follow the target velocity profile pattern, and subjects the head to velocity control toward the target track. In this process of the coarse control unit 52, the seek processing unit 90 switches the selector 80 to the side of the adder unit 76, outputs the control signal output from the coarse control unit 52 to a VCM driver 52, and drives the voice coil motor 18. During the control by the coarse control unit 52, the seek processing unit 90 retrieves the head position signal output from the position signal demodulation unit 74, monitors the number of remaining tracks with respect to the target track, and, if the head position is within the fine switch slice range which is set in advance with respect to the target track when the number reaches a specified number of remaining tracks, determines coarse control normal termination and switches it to the control of the fine control unit 54. Specifically, the fine control unit 54 is operated, and, at the same time, the selector 80 is switched to the side of the adder unit 78. The fine control unit 54 performs position control (settling control) in which the position error of the head position signal output by the position signal demodulation unit 74 is zero wherein the center position of the target track is used as a target value and makes a transition to following control. The predetermined settling time T1 is set as the fine control time by the fine control unit 54, and, at the point when the settling time T1 is elapsed, whether the head position is within the predetermined fine completion slice range, which is set in advance with respect to the target track, or not is determined. When it is within the range, fine control is normally terminated, a transition to the following control, in which the head is caused to follow the center of the target track, is made, and an on-track flag is set, thereby enabling writing or reading of data with respect to the target track. When a coarse seek error occurs in the coarse control by the coarse control unit 52 or a fine seek error occurs in the fine control by the fine control unit 54, the seek retry processing unit 92 operates the seek processing unit 90 again and causes it to perform a seek retry operation. The number of retries by the seek retry processing unit 92 is set in advance; and, when a seek error occurs even when the predetermined number of seek retry processes are executed, abnormality of the seek control unit 50 is determined, and abnormal termination is carried out. The coarse seek error in the control of the coarse control unit 52 is the case in which the head position is out of the predetermined fine switch slice range when it reaches the predetermined number of remaining tracks with respect to the target track. The fine seek error in the fine control unit 54 is the case in which the head position is out of the predetermined fine completion slice range at the point when the predetermined settling time T1 is elapsed. In addition to such seek control system 50-1, in the present embodiment, a rotation disturbance compensation system 60-1 is further provided. The rotation disturbance compensation control system 60-1 is composed of the pair of acceleration velocity sensors 56-1 and 56-2, a differential amplifier 82 provided in the rotation disturbance vibration detection unit 58 of FIGS. 1A and 1B, an AD converter 84, a gain setter 85, and a switch 86. Herein, the AD converter 84, the gain setter 85, and the switch 86 are the functions included in the rotation disturbance compensation control unit 60 provided in the MPU 28 of FIGS. 1A and 1B and the functions realized by executing firmware programs by the MPU 28. The differential amplifier 82 amplified and outputs a differential signal E3 of an acceleration velocity detection signal E1 from the acceleration velocity sensor 56-1 and an acceleration velocity detection signal E2 from the acceleration velocity sensor 56-2. The differential signal E3 of the outputs of the pair of acceleration velocity sensors 56-1 and 56-2 is obtained in order to suppress translation vibration components. Regarding the rotation disturbance vibrations 66 shown in FIG. 3, for example if the distances from the Z axis to the sensors are equal, acceleration velocities having the same magnitude in the opposite directions are applied in the tangent line direction to the acceleration velocity sensors 56-1 and 56-2 disposed in the diagonal direction. Therefore, if the polarity of the acceleration velocity detection signal E1 from the acceleration velocity sensor 56-1 is positive, the polarity of the acceleration velocity detection signal E2 from the acceleration velocity sensor 56-2 is negative, which is the opposite polarity. When these are subjected to differential amplification in the differential amplifier 82, the rotation disturbance vibrations are (E1+E2), and the acceleration velocity detection signal E3, which has undergone addition and amplification, can be obtained. On the other hand, regarding the translation disturbance vibrations 68 in the Z-axis direction shown in FIG. 3, the acceleration velocities having the same magnitude in the same direction are applied to the acceleration velocity sensors 56-1 and 56-2. Therefore, when the acceleration velocity detection signal E2 is subtracted from the acceleration velocity detection signal E1 in the differential amplifier 82, the translation vibration components can be cancelled out and caused to be zero if the detection signal levels of the acceleration velocity sensors 56-1 and 56-2 are the same. However, in practice, if the translation velocity vibrations 68 are generated, the acceleration velocities applied to the acceleration velocity sensors 56-1 and 56-2 cannot be the same, and the acceleration velocity detection signal E3 based on the translation disturbance vibration components corresponding to the difference therebetween is output from the differential amplifier 82. The AD converter 84 retrieves the acceleration velocity detection signal E3 output from the differential amplifier 82 in synchronization with the sampling timing of the servo information recorded on the magnetic disk, obtains a compensation signal E4 by multiplying it by a predetermined gain in the gain setter 85, then outputs the signal to the seek control unit 50, and performs feed forward control for canceling out the rotation disturbance vibration components by the compensation signal E4. In addition to such seek control system 50-1 and rotation disturbance compensation control system 60-1, in the present embodiment, the compensation control switching unit 62 and the switch 86 are further provided as the functions of the controller 88. When the magnetic disk apparatus is started up, the compensation control switching unit 62 for example turns of the switch 86 and initially sets the rotation disturbance compensation control system 60-1 to be in a disabled state. In such a disabled state of the rotation disturbance compensation control system 60-1, when the seek control system 50-1 is operated by a write command or a read command from the host, and if a coarse seek error occurs in the first coarse control by the coarse control unit 52, the compensation control switching unit 62 switches the switch 86 from the current state of off to on so as to enable it and then causes the seek retry processing unit 92 to execute a retry process of the seek control system 50-1. When the switch 86 is on and the rotation disturbance compensation control system 60-1 is in an enabled setting state in the coarse control of the coarse control unit 52, and a coarse seek error occurs in this state, the switch 86 of the compensation control switching system 64-1 is switched from the current state of on to off and disabled, and a retry process by the seek retry processing unit 92 is then executed. In the case in which the coarse control of the coarse control unit 52 succeeds, a transition to the control of the fine control unit 54 is made, and a fine seek error occurs during that process, if the switch 86 is off and the rotation disturbance compensation control system 60-1 is in a disabled setting state, the compensation control switching unit 62 turns on the switch 86, thereby switching the rotation disturbance compensation control unit 60 to an enabled state, and then continues fine control. On the other hand, when a fine seek error occurs during the fine control by the fine control unit 54 in the enabling setting state of the rotation disturbance compensation control system 60-1 wherein the switch 86 is on, the compensation control switching unit 62 switches the switch 86 to be off so as to set the rotation disturbance compensation control system 60-1 to be in a disabled setting state and then continues the fine control.

FIGS. 9A to 9C are time charts showing seek control of a normal case in the present embodiment, wherein FIG. 9A shows a head path 96 along with seek control, FIG. 9B shows coarse control 104 and fine control 106 in the seek control, and FIG. 9 C shows seek control 102 and following control 108 thereafter. Note that the track position in FIGS. 9A to 9C is a cylinder position in the case in which a plurality of magnetic disks are supposed, which is the same meaning. In FIGS. 9A to 9C, first of all, at the time t1, the coarse control 104 is performed by the coarse control unit 52 from a start track 94 indicating a current head position toward a target track 98 based on a write command or a read command. The coarse control 104 is velocity control in which a velocity profile pattern based on the track difference with respect to the target track 98 serves as target values. When the coarse control 104 is performed, as shown in the head path 96, the head is moved from the start track 94 toward the target track 98. When the head is within the range of predetermined switch slice 100 at time t2 when it reaches a predetermined remaining number of tracks with respect to the target track 98, the coarse control 104 is determined to be normally terminated, and it is switched to the fine control 106 by the fine control unit 54. In the fine control 106, predetermined settling time T1 is set from the time t2; and, when the head position is within the range of predetermined fine completion slice 101 with respect to the target track 98 at time t3 when the settling time T1 is elapsed, seek normal termination is determined, an on-track flag is set, a transition to the following control 108 is made, and an on-track flag is set.

FIGS. 10A to 10C are time charts showing seek control in which a coarse seek error occurs during the transition from the coarse control to the fine control in the disabled state in which the switch 86 of the rotation disturbance compensation control system 60-1 of FIG. 8 is off. In a head path 96-1 of FIG. 10A, a head position 110 exceeds fine switch slice 100 at end time t2 of the coarse control 104 of FIG. 10B, and therefore a coarse seek error occurs.

FIGS. 11A to 11C are time charts showing seek control in which a fine seek error occurs during transition from fine control to following control in the state in which the switch 86 is off so as to set the rotation disturbance compensation control system 60-1 to be disabled as well as FIGS. 10A to 10C. In FIGS. 11A to 11C, as shown in FIG. 11A, a head path 96-2 is within the range of fine switch slice 100 at the time t2 when the coarse control is terminated, and normal switching to the fine control 106 can be carried out. However, the head position is varied in the direction deviating from the target track 98 for some reasons during the fine control 106. At the time t3 when the fine control 106 is to be terminated and after the settling time T1 is elapsed, the head is at a head position 112 is largely deviated from the fine completion slice 101, and a fine seek error that is a time out error of the settling time is generated.

Figures 12A, 12B, 12C, 12D:
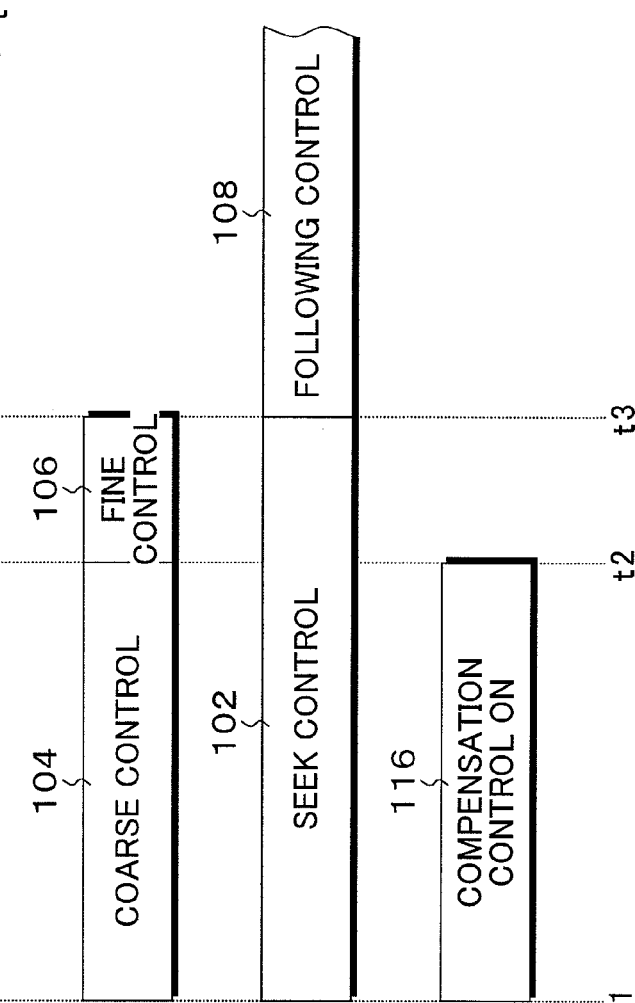

FIGS. 12A to 12D are time charts showing the case in which a coarse seek error occurs upon the transition from coarse control to fine control in the state in which the rotation disturbance compensation control is on. FIG. 12A shows a head path 96-3, FIG. 12B shows the coarse control 104 and the fine control 106, FIG. 12C shows the seek control 102 and the following control 108, and FIG. 12D shows that the compensation control is on 116 by the rotation disturbance compensation control system 60-1 in the seek control 102. In this manner, the coarse control 104 is started from the start track 94 toward the target track 98 in the state in which the compensation control by the rotation disturbance compensation control system 60-1 is on. However, when the compensation signal E4 from the rotation disturbance compensation control system 60-1 contains, for example, the noise due to the S/N ratios of the sensors itself shown in FIG. 4, power source ripple noise as shown in FIG. 6, or translation disturbance vibration components in the Z-axis direction as shown in FIG. 7, a compensation signal is added to the adder unit 76 of the coarse control unit 52 as a noise signal irrelevant to the rotation disturbance vibrations, which are the compensation objects. Therefore, at the time t2 when the track difference from the start track 94 to the target track 98 is a predetermined value, the head position 114 is at a position out of the fine switch slice 100, and therefore a coarse seek error occurs. When such coarse seek error occurs, in the present embodiment, the compensation control switching unit 64 of FIG. 8 switches the state in which the compensation control of the rotation disturbance compensation control system 60-1 is on in FIGS. 12A to 12D to the opposite state in which the compensation control is off, and a seek retry process is executed.

FIGS. 13A to 13D are time charts showing retry seek control which is performed when the rotation disturbance compensation control is off after the coarse seek error of FIGS. 12A to 12D. In the retry seek control of FIGS. 13A to 13D, as shown in FIG. 13D, it is switched to compensation control off 118, and the coarse control 104 is performed; therefore, the noise components other than the rotation disturbance vibration components contained in the compensation signal E4 output from the rotation disturbance compensation control system 60-1 are not added to the control signal by the coarse control unit 52. Therefore, as shown in a head path 96-4, the head position is within the range of the fine switch slice 100 at the termination time t2 of the coarse control, normal switching to the fine control 106 is performed, the head position is within the range of the fine completion slice 101 at the time t3 when the settling time T1 is elapsed, the seek control is normally terminated, and a transition to the following control 108 can be made.

FIGS. 14A to 14D are time charts showing the case in which a coarse seek error occurs upon transition from the coarse control to the fine control in the state in which the rotation disturbance compensation control is off. In FIGS. 14A to 14D, as shown in FIG. 14D, in this case, the rotation disturbance compensation control system 60-1 is caused to be compensation control off 118 preceding the seek control. When the coarse control 104 is performed in this state, and if rotation disturbance vibrations such as that shown in the acceleration velocity detection signal 71 of the case of the rotation disturbance vibrations of FIG. 5 are added, a head path 96-5 approaches the target track 98 while it is largely varied due to the rotation disturbance vibrations, it is at a head position 120 at the end time t2 of the coarse control, and a coarse seek error occurs since it exceeds the fine switch slice 100. When the coarse seek error occurs as described above, before performing retry seek, the switch 86 of the rotation disturbance compensation control system 60-1 is switched from the previous state of off to on, thereby enabling the rotation disturbance compensation control system 60-1.

FIGS. 15A to 15D are time charts showing retry seek control performed when the rotation disturbance compensation control system 60-1 is on after the seek error of FIG. 14A. In FIGS. 15A to 15D, as shown in FIG. 15D, it is switched to compensation control on 116 against the coarse seek error. Therefore, in the coarse control 104, the compensation signal E4 which is an acceleration velocity detection signal based on the rotation disturbance vibration components is added from the rotation disturbance compensation control system 60-1 to the adder unit 76 of the coarse control unit 52, and feed forward control is performed so that the rotation disturbance components in the coarse control 104 are cancelled out. Therefore, with respect to the head path 96-5 of FIG. 14A, the position variation of a head path 96-6 of FIG. 15A can be suppressed by the compensation control on 116, the head position is within the range of the fine switch slice 100 at the end time t2 of the coarse control, and switching to the fine control 106 can be normally performed. Regarding the time t3 after the settling time T1 is elapsed in the fine control 106, the head position is within the fine completion slice 101; therefore, a transition to the following control 108 can be normally performed.

FIGS. 16A to 16D are time charts showing the case in which a fine seek error occurs upon the transition from the fine control to the following control when the rotation disturbance compensation control is on in the state in which noise disturbance other than the rotation disturbance vibrations are added. In FIGS. 16A to 16D, as shown in FIG. 16D, the compensation control is on 116 in the seek control 102. In the state of the compensation control on 116, the head position approaches the target track 98 as shown in a head path 96-7 by the coarse control 104. Although the head position is varied since the compensation signal caused by noise disturbance such as power source ripples or translation disturbance vibrations other than the rotation disturbance vibrations is subjected to feed forward control since the compensation control on 116, the head position is within the range of the fine switch slice 100 at the time t2; therefore, switching to the fine control 106 is performed. However, since the unnecessary compensation according to the noise disturbance other than rotation disturbance vibrations is performed, the head position is largely varied as shown in the head path 96-8 even during the fine control 106, the head position largely deviates from the fine completion slice 101 at the time t3 when the settling time T1 is elapsed, and a fine seek error occurs. With respect to such case of FIGS. 16A to 16D, in the present embodiment, as shown in FIGS. 17A to 17D, at time t23 when the predetermined time T2 is elapsed after the fine control 106 is started at the time t2, whether the head position is within the range of the fine completion slice 101 or not as shown in a head path 96-10 is determined. In this case, the head position is out of the fine completion slice 101; therefore, it is switched to the compensation control off 118 at the time t23 so that unnecessary compensation signal is not added from the rotation disturbance compensation control system 60-1 to the control signal of the fine control unit 54. As a result, the position variation due to the unnecessary disturbance compensation signal is suppressed, as shown in a head path 96-11, the head position is within the range of the fine completion slice 101 at the time t3 when the settling time T1 is elapsed, and a transition to the following control 108 can be normally made.

FIGS. 18A to 18D are time charts showing the case in which a fine seek error occurs upon the transition from the fine control to the following control when the rotation disturbance compensation control is off in the state in which the rotation disturbance vibrations are added. In FIGS. 18A to 18D, as shown in FIG. 18D, the coarse control 104 is performed in the state the compensation control off 118, and switching to the fine control 106 is performed since the head position 126 is within the range of the fine switch slice 100 at the time t2. However, due to the position variation of a head path 96-13 in the control of the fine control 106, it is at a head position 128 at the time t3 when the settling time T1 is elapsed, and a fine seek error occurs since it exceeds the fine completion slice 101. With respect to such fine seek error in the fine control 106, in the present embodiment, as shown in FIGS. 19A to 19D, in the first half of the settling time T1 when the fine control 106 is performed, predetermined time T2 which is for example half time thereof is set, and whether the head position is within the fine completion slice 101 or not is determined at the point when T2 is elapsed after the fine control 106 is started. In a head path 96-15 in the fine control 106 of FIG. 19A, the head position is out of the fine completion slice 101 at the time t23 when the predetermined time T2 is elapsed in the fine control 106 after the time t2; therefore, in this case, as shown in FIG. 19D, it is switched from the previous compensation control off 118 to the opposite compensation control on 116. Therefore, although the seek error has occurred in the first half of the fine control 106, when the compensation signal of the rotation disturbance vibrations are added when the compensation control on 116, the position error due to the rotation disturbance vibrations is eliminated as shown in a head path 96-16 since the compensation control is on 116, the head position is within the range of the fine completion slice 101 at the time t3 when the settling time T1 is elapsed, the seek control is normally completed, and a transition to the following control 108 can be made.

FIGS. 20A to 20D are flow charts showing the seek control unit 50 according to the present embodiment including on/off switching of the rotation disturbance compensation control.

Figure 20A:
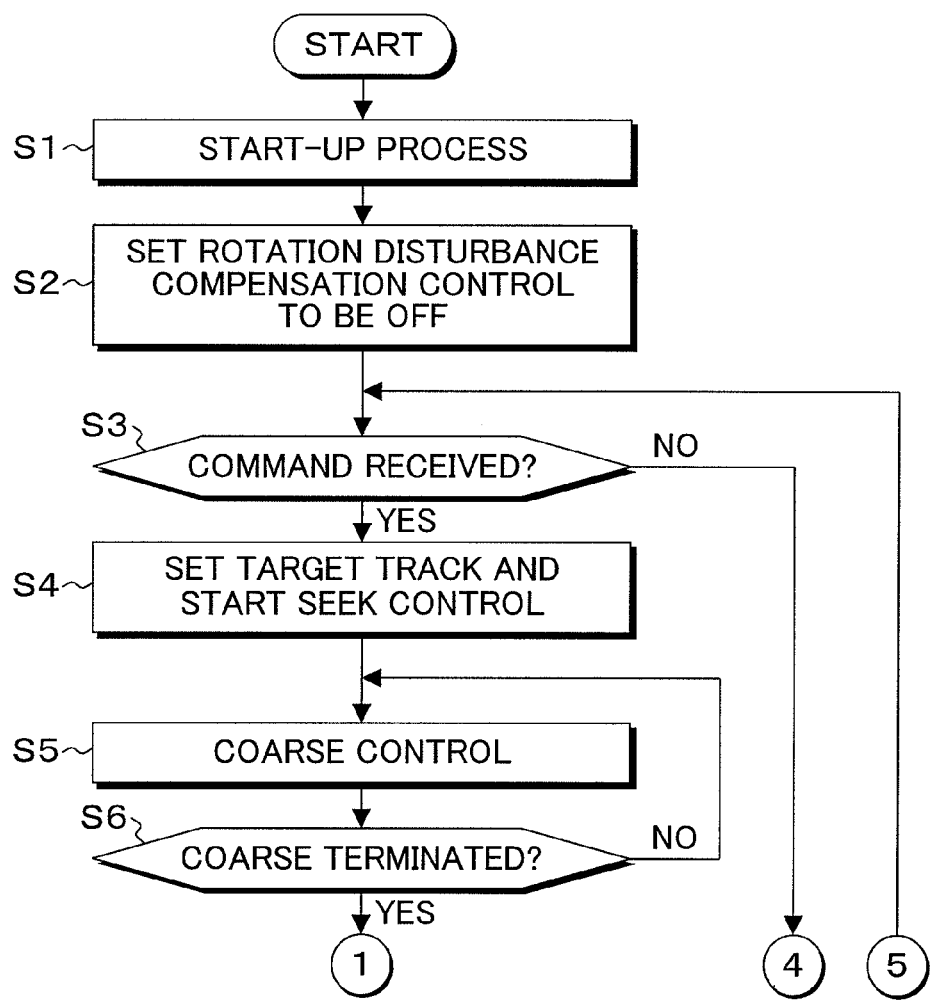
FIGS. 20A to 20D are flow charts showing seek control of the present embodiment including on/off switching of rotation disturbance compensation control.
Figure 20B:
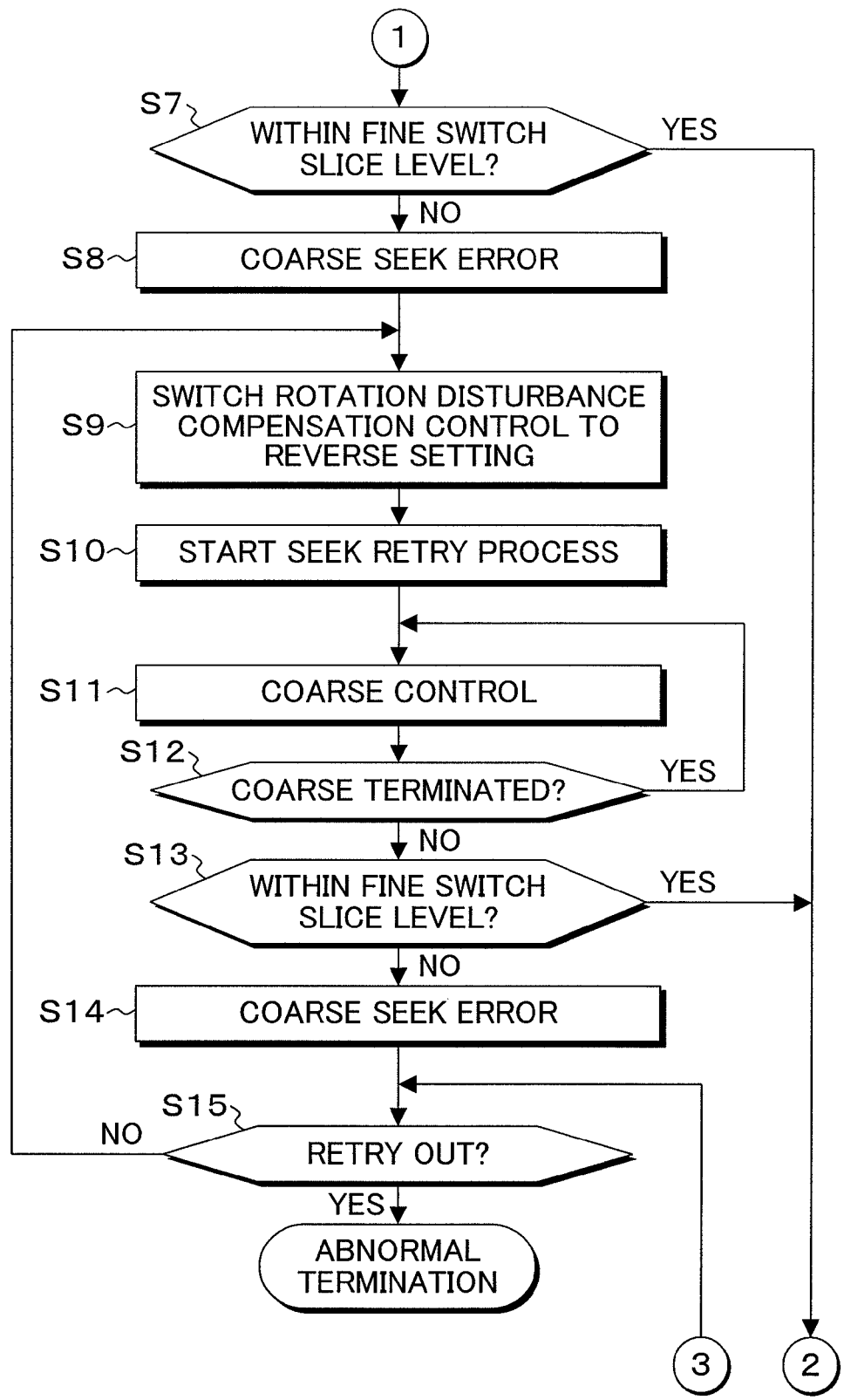
Figure 20C:
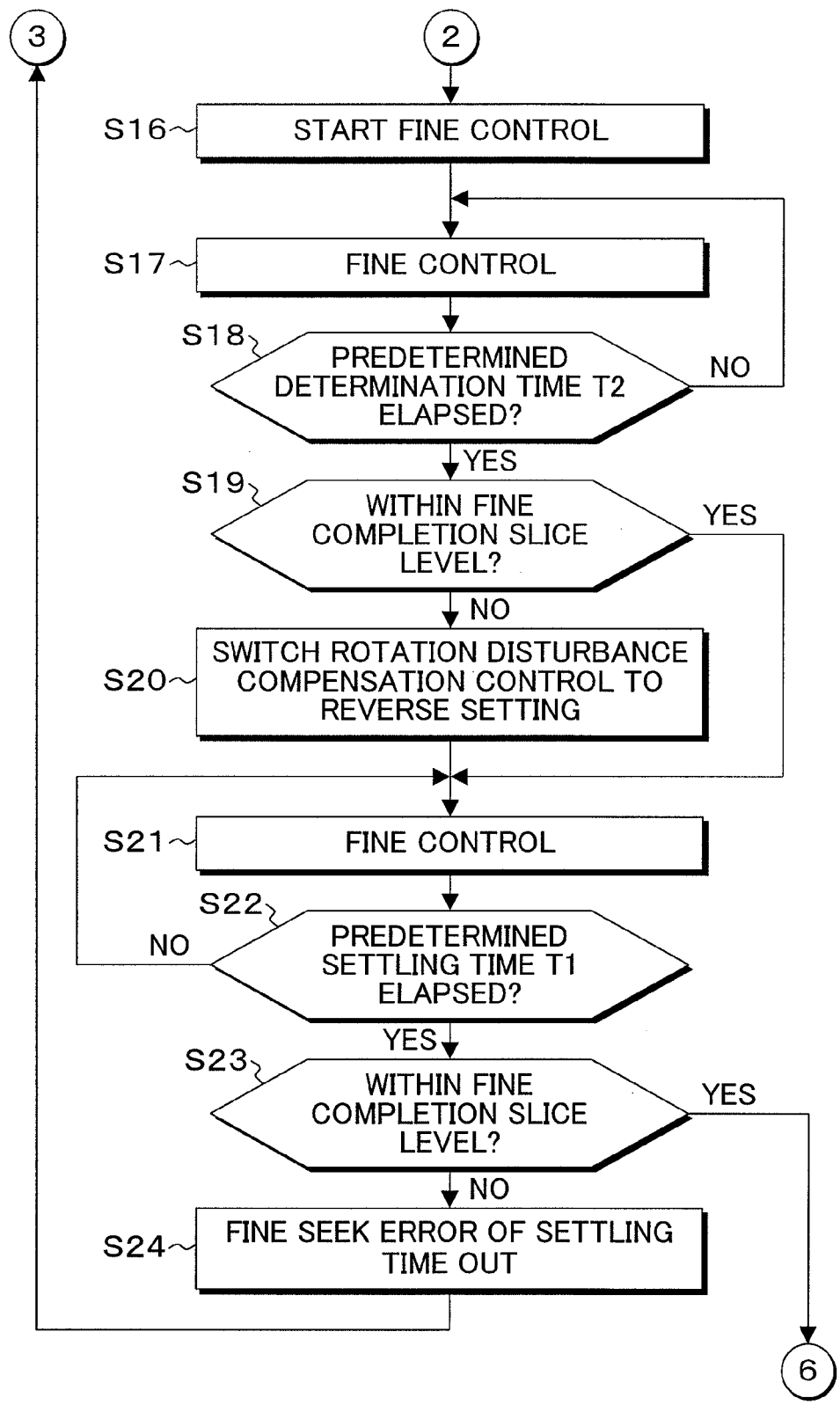
Figure 20D:
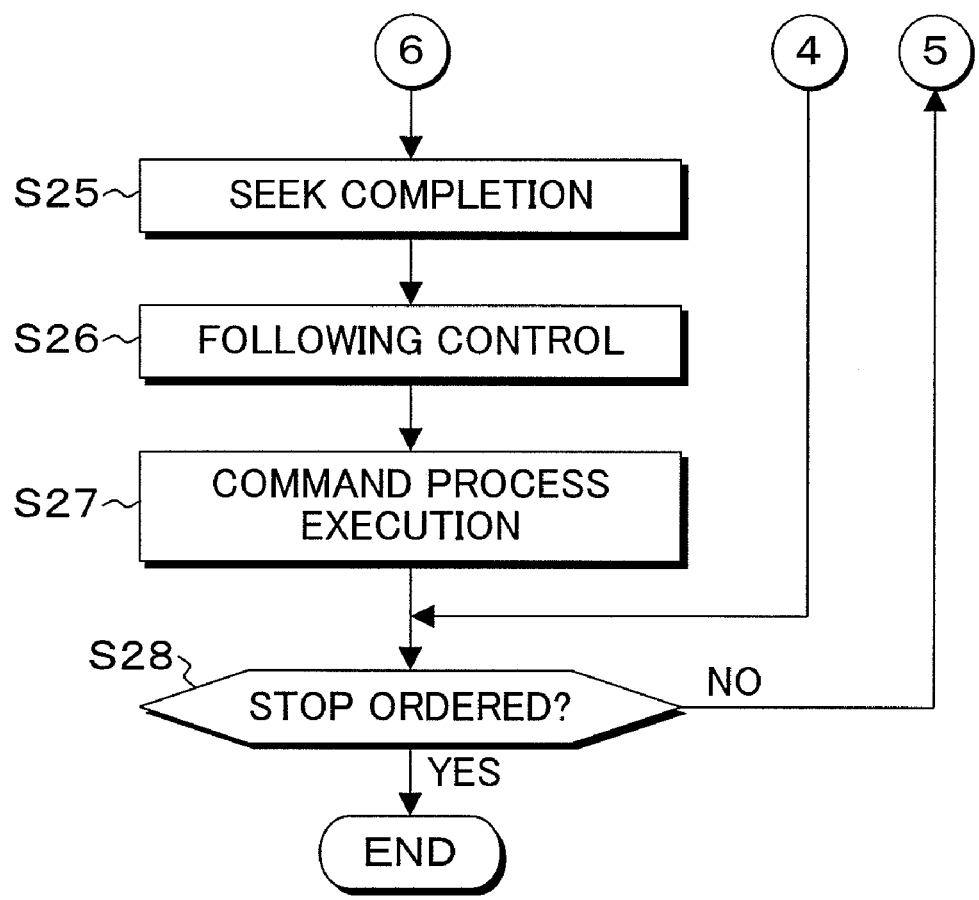

In FIGS. 20A and 20B, when the power of the magnetic disk apparatus 10 is turned on, a start-up process is performed in step S1. In this start-up process, after self diagnosis and initializing processes are performed, for example, firmware programs are loaded from the magnetic disk medium to the memory 31 through execution of boot code and executed by the MPU 28. When the start-up process is finished, in step S2, with respect to the compensation control by the rotation disturbance compensation control system 60-1, a disabled state in which the switch 86 of FIG. 8 is off is set. Subsequently, in step S3, whether a command is received or not from the host is checked. When the command is received, the process proceeds to step S4, in which a target track specified by the command is set, and seek control is started. In this seek control, first, coarse control is executed in step S5. When the number of remaining tracks to the target track reaches a predetermined value during the coarse control, and coarse termination is determined in step S6, the process proceeds to step S7, in which whether the head position is within a fine switch slice level or not is checked. When it is out of the fine switch slice level, a coarse seek error is determined in step S8, and the setting state of the rotation disturbance compensation control system 60-1 is switched to the reverse setting (opposite setting) in step S9. For example, if it is an off setting in step S2, it is caused to be a reverse setting and switched to an on setting in step S9. Subsequently, in step S10, a seek retry process is started in the state in which the rotation disturbance compensation control system 60-1 is switched to the on setting, which is the reverse setting. Also in this seek retry process, first, coarse control is performed in step S11; and, when the number of remaining tracks to the target track reaches a predetermined value and coarse termination is determined in step S12, whether the head position is within the fine switch slice level or not is checked in step S13. If it is out of the fine switch slice level, a coarse seek error occurs again in step S14; and, if it has not reached the number of retries which is set in advance in step S15, the process returns to step S9, and the seek retry process including the reverse setting of the rotation disturbance compensation control system 60-1 is repeated. When a coarse seek error occurs even through the predetermined number of retries, retry out occurs in step S15, and the process results in abnormal termination. On the other hand, when the head position is within the fine switch slice level in the coarse control or the coarse control by the retry seek in step S7 or step S13, the process proceeds to step S16 of FIGS. 20C and 20D, and fine control by the fine control unit 54 is started. During the fine control in step S17, elapse of the predetermined determination time T2 is checked in step S18; and, when the determination time T2 is elapsed, the process proceeds to step S19, and whether the head position is within the fine completion slice level or not is checked. When the head position is out of the fine completion slice level, the process proceeds to step S20, in which the rotation disturbance compensation control system 60-1 is switched to the reverse setting. For example, if the rotation disturbance compensation control system 60-1 is on when the fine control is started, it is switched to be off as the reverse setting, or, reversely, if it is off, it is switched to be on as the reverse setting. Subsequently, the fine control is continued in step S21; and, when elapse of the predetermined settling time T1 is determined in step S22, whether the head position is within the fine completion slice level or not is determined in step S23. If it is out of the level, a fine seek error occurs in step S24; and, in this case, the process returns to step S9 via the retry out check of step S15 of FIGS. 20A and 20B, and, as well as the case in which the seek error occurs in the coarse control, a seek retry process is executed. When the head position is within the fine completion slice level in step S23 of FIGS. 20C and 20D, the process proceeds to step S25 in which seek is completed, a transition to following control is made in step S26, an on-track flag is set, a command process of the write command or read command is executed in step S27, and the processes from step S3 are repeated until stop is ordered in step S28. Note that, the position control of leading the head position to the target track is taken as an example as the fine control in the above described embodiment; however, position path control may be performed instead of that. In the position path control, based on the current position and current velocity of the head, a position path and a feed forward current for reducing the stabilization time (settling time) are generated, and the position path and the feed forward current are added to a feed back control system, which calculates a control distance according to the position error between the current position and the target position, so as to perform control. As the position path control, for example, Japanese Patent Application Laid-Open Publication No. 2006-179185 can be applied without change. In the case in which the position path control is applied to the present embodiment, when the head position is out of the fine completion slice at the point the determination time T2 is elapsed and a fine seek error has occurred, the setting of the rotation disturbance compensation control system 60-1 is switched to the reverse setting so as to continue the position path control. Moreover, the present invention includes arbitrary modifications that do not impair the object and advantages, and the present invention is not limited by the numerical values shown in the above described embodiment.

What is claimed is:

1. A storage apparatus comprising
a seek control unit which moves a head to a vicinity of a target track of a storage medium by coarse control of a rotary actuator and then switches the control to fine control so as to position the head to the target track;
a rotation disturbance compensation control unit which adds a rotation disturbance vibration detection signal detected based on an acceleration velocity sensor to the seek control unit as a compensation signal so as to cancel out a rotation disturbance vibration component; and
a compensation control switching unit which sets the rotation disturbance compensation control unit to be either enabled or disabled, switches the enabling or disabling setting state of the rotation disturbance compensation control unit to the opposite setting state when a coarse seek error, in which the head position is out of a predetermined fine switch error range with respect to the target track, is determined at the end of the coarse control by the seek control unit, and causes the seek control unit to perform seek again.

2. The storage apparatus according to claim 1, wherein, furthermore, when a fine seek error, in which the head position is not moved into a predetermined fine completion error range with respect to the target track, is determined even when predetermined time is elapsed during the fine control by the seek control unit, the compensation control switching unit switches the enabling or disabling setting state of the rotation disturbance compensation control unit to the opposite setting state and continues the fine control.

3. The storage apparatus according to claim 1, wherein the compensation control switching unit turns on the compensation signal to be added to the seek control unit when the rotation disturbance compensation control unit is to be enabled and turns off the compensation signal to be added to the seek control unit when the rotation disturbance compensation control unit is to be disabled.

4. The storage apparatus according to claim 1, wherein the compensation control switching unit adjusts the compensation signal to be added to the seek control unit by multiplying the signal by a predetermined gain when the rotation disturbance compensation control unit is to be enabled and turns off the compensation signal to be added to the seek control unit when the rotation disturbance compensation control unit is to be disabled.

5. The storage apparatus according to claim 1, wherein the rotation disturbance compensation control unit detects a differential signal of acceleration velocity detection signals from a pair of acceleration velocity sensors as the rotation disturbance vibration detection signal.

6. A storage apparatus comprising
a seek control unit which moves a head to a vicinity of a target track of a storage medium by coarse control of a rotary actuator and then switches the control to fine control so as to position the head to the target track;
a rotation disturbance compensation control unit which adds a rotation disturbance vibration detection signal detected based on an acceleration velocity sensor to the seek control unit as a compensation signal so as to cancel out a rotation disturbance vibration component; and
a compensation control switching unit which sets the rotation disturbance compensation control unit to be either enabled or disabled, switches the enabling or disabling setting state of the rotation disturbance compensation control unit to the opposite setting state when a fine seek error, in which the head position is not moved into a predetermined fine completion error range with respect to the target track, is determined even when predetermined time is elapsed during the fine control, and continues the fine control.

7. The storage apparatus according to claim 6, wherein the compensation control switching unit turns on the compensation signal to be added to the seek control unit when the rotation disturbance compensation control unit is to be enabled and turns off the compensation signal to be added to the seek control unit when the rotation disturbance compensation control unit is to be disabled.

8. The storage apparatus according to claim 6, wherein the compensation control switching unit adjusts the compensation signal to be added to the seek control unit by multiplying the signal by a predetermined gain when the rotation disturbance compensation control unit is to be enabled and turns off the compensation signal to be added to the seek control unit when the rotation disturbance compensation control unit is to be disabled.

9. The storage apparatus according to claim 6, wherein the rotation disturbance compensation control unit detects a differential signal of acceleration velocity detection signals from a pair of acceleration velocity sensors as the rotation disturbance vibration detection signal.

10. A control method of a storage apparatus comprising
a seek control step of moving a head to a vicinity of a target track of a storage medium by coarse control of a rotary actuator and then switching the control to fine control so as to position the head to the target track;
a rotation disturbance compensation control step of adding a rotation disturbance vibration detection signal detected based on an acceleration velocity sensor to the seek control step as a compensation signal so as to cancel out a rotation disturbance vibration component; and
a compensation control switching step of setting the rotation disturbance compensation control step to be either enabled or disabled, switching the enabling or disabling setting state of the rotation disturbance compensation control step to the opposite setting state when a coarse seek error, in which the head position is out of a predetermined fine switch error range with respect to the target track, is determined at the end of the coarse control by the seek control step, and causes the seek control step to perform seek again.

11. The control method of the storage apparatus according to claim 10, wherein, furthermore, when a fine seek error, in which the head position is not moved into a predetermined fine completion error range with respect to the target track, is determined even when predetermined time is elapsed during the fine control by the seek control step, the compensation control switching step switches the enabling or disabling setting state of the rotation disturbance compensation control step to the opposite setting state and continues the fine control.

12. The control method of the storage apparatus according to claim 10, wherein the compensation control switching step turns on the compensation signal to be added to the seek control step when the rotation disturbance compensation control step is to be enabled and turns off the compensation signal to be added to the seek control step when the rotation disturbance compensation control step is to be disabled.

13. The control method of the storage apparatus according to claim 10, wherein the compensation control adjustment step adjusts the compensation signal to be added to the seek control step by multiplying the signal by a predetermined gain when the rotation disturbance compensation control step is to be enabled and turns off the compensation signal to be added to the seek control step when the rotation disturbance compensation control step is to be disabled.

14. The control method of the storage apparatus according to claim 10, wherein the rotation disturbance compensation control step detects a differential signal of acceleration velocity detection signals from a pair of acceleration velocity sensors as the rotation disturbance vibration detection signal.

15. A control method of a storage apparatus including
a seek control step of moving a head to a vicinity of a target track of a storage medium by coarse control of a rotary actuator and then switching the control to fine control so as to subject the head to seek control to the target track;
a rotation disturbance compensation control step of adding a rotation disturbance vibration detection signal detected based on an acceleration velocity sensor to the seek control step as a compensation signal so as to cancel out a rotation disturbance vibration component; and
a compensation control switching step of setting the rotation disturbance compensation control step to be either enabled or disabled, switching the enabling or disabling setting state of the rotation disturbance compensation control step to the opposite setting state when a fine seek error, in which the head position is not moved into a predetermined fine completion error range with respect to the target track, is determined even when predetermined time is elapsed during the fine control by the seek control step, and continues the fine control.

16. The control method of the storage apparatus according to claim 15, wherein the compensation control switching step turns on the compensation signal to be added to the seek control step when the rotation disturbance compensation control step is to be enabled and turns off the compensation signal to be added to the seek control step when the rotation disturbance compensation control step is to be disabled.

17. The control method of the storage apparatus according to claim 15, wherein the compensation control switching step adjusts the compensation signal to be added to the seek control step by multiplying the signal by a predetermined gain when the rotation disturbance compensation control step is to be enabled and turns off the compensation signal to be added to the seek control step when the rotation disturbance compensation control step is to be disabled.

* * * * *